United States Patent
Asplund et al.

(10) Patent No.: US 11,909,487 B2
(45) Date of Patent: Feb. 20, 2024

(54) BEAMFORMING FOR RANDOM ACCESS CHANNEL (RACH)

(71) Applicant: Telefonaktiebolaget LM Ericsson (PUBL), Stockholm (SE)

(72) Inventors: Henrik Asplund, Stockholm (SE); Arne Simonsson, Gammelstad (SE); David Astely, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 511 days.

(21) Appl. No.: 17/267,355

(22) PCT Filed: Aug. 10, 2018

(86) PCT No.: PCT/EP2018/071761
§ 371 (c)(1),
(2) Date: Feb. 9, 2021

(87) PCT Pub. No.: WO2020/030282
PCT Pub. Date: Feb. 13, 2020

(65) Prior Publication Data
US 2021/0266057 A1    Aug. 26, 2021

(51) Int. Cl.
*H04B 7/06*    (2006.01)

(52) U.S. Cl.
CPC ...... *H04B 7/0695* (2013.01); *H04W 74/0833* (2013.01)

(58) Field of Classification Search
CPC .. H04W 74/0833; H04B 7/0695; H04B 7/088
See application file for complete search history.

(56) References Cited

U.S. PATENT DOCUMENTS

| | | | | |
|---|---|---|---|---|
| 11,490,441 B2 * | 11/2022 | Babaei | ............... | H04W 72/1263 |
| 2017/0332406 A1 * | 11/2017 | Islam | ................ | H04W 74/0833 |

(Continued)

FOREIGN PATENT DOCUMENTS

WO    2018 084663 A1    5/2018

OTHER PUBLICATIONS

ETSI TS 138 300 V15.2.0 (Sep. 2018); 5G; NR; Overall description; Stage-2; (3GPP TS 38.300 version 15.2.0 Release 15) (Year: 2018).*

(Continued)

*Primary Examiner* — Benjamin H Elliott, IV
(74) *Attorney, Agent, or Firm* — Christopher & Weisberg, P.A.

(57) ABSTRACT

The present disclosure relates to a method performed by a network node for beamforming, to a network node and to a system including a network node. One aspect of the disclosure provides a method (900) comprising: obtaining (910), at the network node (800), information relating to a plurality of signals received or transmitted using a set of receiving beams or a set of transmitting beams of the network node (800), each individual beam of the set having a unique beam direction; determining a set of candidate beams for use by the network node (800) for synchronisation signal, SS, transmission or random access channel, RACH, detection; based on the obtained information, selecting one or more of the determined candidate beams; and using the selected one or more of the determined candidate beams for SS transmission or RACH detection by the network node (800).

20 Claims, 18 Drawing Sheets

(56) References Cited

U.S. PATENT DOCUMENTS

| | | | | |
|---|---|---|---|---|
| 2017/0332407 | A1* | 11/2017 | Islam | H04W 52/42 |
| 2018/0034515 | A1* | 2/2018 | Guo | H04B 7/0686 |
| 2018/0255468 | A1* | 9/2018 | Huang | H04B 7/088 |
| 2019/0081688 | A1* | 3/2019 | Deenoo | H04L 5/005 |
| 2019/0104549 | A1* | 4/2019 | Deng | H04L 27/2607 |
| 2019/0116613 | A1* | 4/2019 | Abedini | H04W 74/02 |
| 2020/0196216 | A1* | 6/2020 | Hui | H04W 36/36 |
| 2020/0205193 | A1* | 6/2020 | Amuru | H04B 7/088 |
| 2021/0176670 | A1* | 6/2021 | Keskitalo | H04W 76/10 |
| 2021/0266057 | A1* | 8/2021 | Asplund | H04W 74/0833 |
| 2023/0064052 | A1* | 3/2023 | Moon | H04B 7/0695 |
| 2023/0189343 | A1* | 6/2023 | Rao | H04L 5/0023 |
| | | | | 370/329 |

OTHER PUBLICATIONS

PCT Notification of Transmittal of the International Search Report and the Written Opinion of the International Searching Authority, or the Declaration issued for International application No. PCT/EP2018/071761 dated Apr. 15, 2019.

* cited by examiner

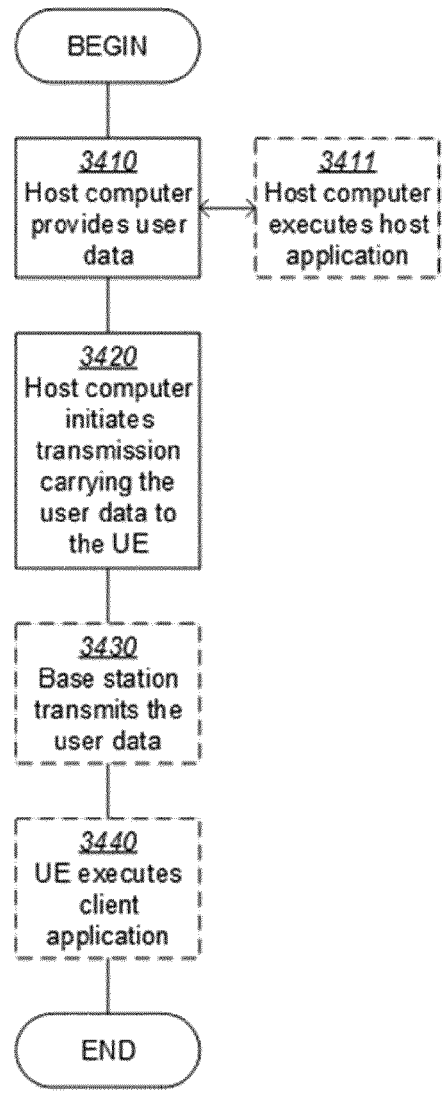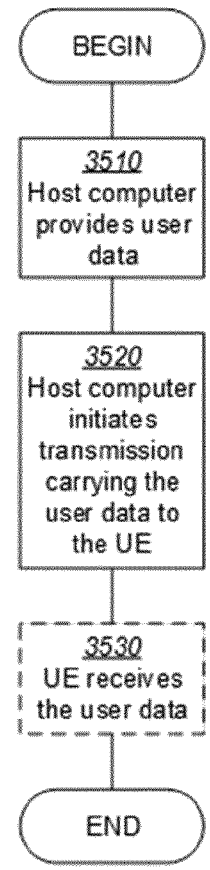
Figure 17
Figure 18

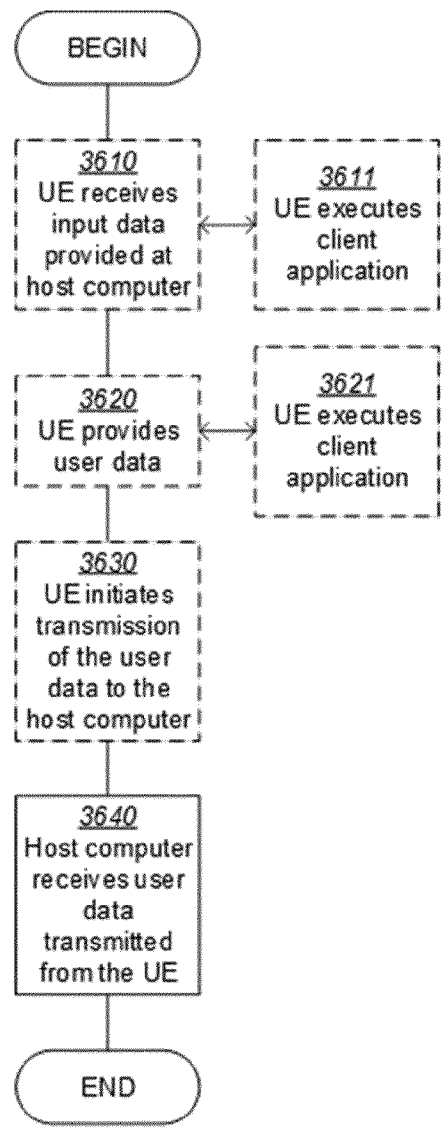
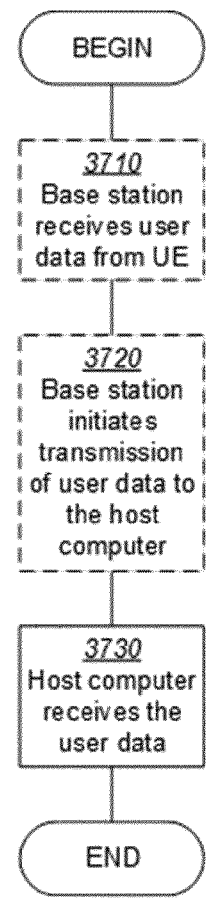
Figure 19
Figure 20

BEAMFORMING FOR RANDOM ACCESS CHANNEL (RACH)

PRIORITY

This nonprovisional application is a U.S. National Stage Filing under 35 U.S.C. § 371 of International Patent Application Serial No. PCT/EP2018/071761 filed Aug. 10, 2018 and entitled "BEAMFORMING FOR RANDOM ACCESS CHANNEL (RACH)" which is hereby incorporated by reference in its entirety.

TECHNICAL FIELD

The present disclosure relates to beamforming for Random Access Channel (RACH).

BACKGROUND

In mobile telecommunications networks such as $3^{rd}$ Generation Partnership Project (3GPP) Long Term Evolution (LTE) or New Radio (NR), a network node such as a base station, eNodeB (eNB), Transmit/Receive Point (TRP), gNB or the like serves a plurality of wireless devices such as user equipments (UEs) within a cell of the network, see for example 3GPP TS 38.300 V15.2.0 (2018 Jun. 20). FIG. 1 schematically illustrates a cell 110 of a mobile telecommunications network in which a network node 120 serves the cell 100 to provide network access to a plurality of wireless devices 130-144.

As the number of such wireless devices requiring access to mobile telecommunications networks has increased, network nodes such as base stations have become increasingly sophisticated, employing a variety of technologies in order to maximise use of available bandwidth to provide network access to an increasing number of wireless devices.

One technology that may be employed in network nodes is beamforming. Beamforming allows a network node to transmit and receive signals in a highly directional manner, thereby providing high gain over a narrow coverage area, which can help the network node to transmit signals to and receive signals from devices that are located in areas of a cell served by the network node that would otherwise be difficult to reach, e.g. areas at the edge of the cell (e.g. devices 132, 138, 140 in FIG. 1).

When a wireless device such as a UE first attempts to connect to a network node such as an eNB, the angular direction of the UE with respect to the eNB is not known to the eNB, and so the eNB cannot initially select a narrow beam with which to communicate with the UE.

In order to determine the angular location of a new UE entering a cell served by the eNB with respect to the eNB, the eNB may transmit synchronisation signal (SS) blocks by sweeping a plurality of beams in different directions covering the whole of the cell area.

The UE receives one or more SS blocks and selects a suitable one of the plurality of beams, based on measurements performed by the UE on the received SS block(s), for transmission of a connection request to the eNB via a Random Access Channel (RACH) corresponding to the selected beam. The eNB sweeps the RACH Rx beams corresponding to the beams used to transmit the SS blocks to detect and receive a connection request from the UE. The increased gain provided by using a narrow beam rather than a broader beam to transmit the SS signals and receive the RACH signals facilitates the establishment of connections between the eNB and UEs in hard to reach areas of the cell.

As will be appreciated, however, sweeping through a large number of SS beams and RACH Rx beams takes time and thus introduces a delay in the RACH connection process. Thus, there is a trade-off between the increased gain offered by the use of a narrow beam and the delay incurred in sweeping a large number of such narrow beams. Furthermore, for reasons including delay, complexity, and signalling overhead, the maximum number of SS beams that the UE should expect to be in use may be limited, e.g. by the wireless standard to which the eNB and UE conform.

FIG. 2 illustrates a beamforming arrangement that may be used as a compromise between the competing requirements of high beamforming gain and low delay.

FIG. 2 shows a grid of beams (GoB) comprising, in the illustrated example, a set of 48 individual beams, each having a fixed azimuth angle and a fixed elevation angle relative to a common origin, with each individual beam having a different combination of azimuth angle and elevation angle than the other beams of the set. In the example GoB 200 of FIG. 1, eight RACH Rx beams 210, 220, 230, 240, 250, 260, 270, 280 (each identified by a different fill pattern in the schematic representation of FIG. 2) are formed by grouping sets of six individual beams together. The arrangement of eight RACH Rx beams (each made up of six individual beams) reduces the total number of beams to be swept (as compared to an arrangement in which, for example, all 48 individual beams are swept) at the expense of a reduction in the gain of each of the RACH Rx beams (as compared to an arrangement in which all 48 individual beams are swept).

FIG. 3 shows an example of a distribution of measured signal strength (in terms of beam reference signal received power, BRSRP) for signals received by the eight RACH Rx beams formed by grouping the individual beams of the GoB 200 of FIG. 2, as compared to the signal strength of signals received from the 48 individual beams of the GoB 200. As is apparent from FIG. 2, the signal strength when the eight RACH Rx beams are swept is slightly (in this example around 6 dB) worse than the signal strength when the 48 individual beams are swept.

Thus, the beamforming arrangement illustrated in FIG. 2, which sweeps through eight beam groups rather than through 48 individual beams, provides a reduction in the delay incurred by sweeping through 48 individual beams, but at a cost of reduced gain.

SUMMARY

An object achieved by at least one aspect of the invention is enable the improvement of a further gain of RACH Rx beams without introducing significant additional delay in the RACH process.

According to a first aspect, the disclosure provides a method performed by a network node for beamforming. The method comprises: obtaining, at the network node, information relating to a plurality of signals received or transmitted using a set of receiving beams or a set of transmitting beams of the network node, each individual beam of the set having a unique beam direction; determining a set of candidate beams for use by the network node for synchronisation signal (SS) transmission or random access channel (RACH) detection; based on the obtained information, selecting one or more of the determined candidate beams; and using the selected one or more of the determined candidate beams for SS transmission or RACH detection by the network node.

The plurality of signals received or transmitted using the set of receiving beams or the set of transmitting beams of the network node may comprise: synchronisation signal blocks; or RACH signals; or reference signals.

The information may relate to one or more of: path loss between a receiving device and the network node; signal strength of a signal of the plurality of signals transmitted by the network node; and a random access success ratio for a beam of the set of beams used by the network node to transmit the plurality of signals.

The information may be derived from multiple measurements performed over a period of time.

The information may comprise a function of direction of arrival, DoA, of each individual beam.

The DoA may be defined at least in part by an angle of elevation and an azimuth angle.

Obtaining the information may comprise: transmitting by the network node, using some or all of the individual beams of the set of transmitting beams, a plurality of signals; and/or receiving, at the network node, signals from one or more receiving devices; and deriving the information from the received signals or from information derived from the received signals.

The signals received at the network node may be response signals received from the one or more receiving devices in response to the transmitted plurality of signals.

Selecting one or more of the candidate beams may comprise selecting a first subset of the set of candidate beams and selecting a second subset of the set of candidate beams, and using the selected one or more of the determined candidate beams for SS transmission or RACH detection by the network node may comprise using the selected first subset for individual narrow-beam SS transmission or RACH detection and using the selected second subset for broad-beam SS transmission or RACH detection.

The first subset may comprise a predetermined number of the candidate beams which are associated in the information with a lowest signal strength or a highest path loss.

Alternatively, selecting one or more of the candidate beams may comprise: dividing a first beam group comprising the candidate beams having the lowest RACH success ratio into two RACH receive beams for use by the network node for RACH detection; and combining a second beam group and a third beam group comprising the candidate beams having the highest RACH success ratio to form a single RACH receive beam for use by the network node for RACH detection.

The set of beams may comprise a grid of beams.

A second aspect of the disclosure provides a network node comprising: a radio interface comprising a beamforming antenna; a processor; and memory, wherein the memory stores instructions which, when executed by the processor, cause the network node to: obtain information relating to a plurality of signals received or transmitted using a set of receiving beams or a set of transmitting beams of the network node, each individual beam of the set of transmitting beams having a unique beam direction; determine a set of candidate beams for use by the network node for SS) transmission or RACH detection; based on the obtained information, select one or more of the determined candidate beams; and use the one or more determined candidate beams for SS transmission or RACH detection by the network node.

The plurality of signals received or transmitted using a set of receiving beams or the set of transmitting beams of the network node may comprise: synchronisation signal blocks; or RACH signals; or reference signals.

The information may relate to one or more of: path loss between a receiving device and the network node; signal strength of a signal of the plurality of signals transmitted by the network node; and a random access success ratio for a beam of the set of beams used by the network node to transmit the plurality of signals.

The information may be derived from multiple measurements performed over a period of time.

The information may comprise a function of direction of arrival, DoA, of each individual beam.

The DoA may be defined at least in part by an angle of elevation and an azimuth angle.

The instructions which, when executed by the processor, cause the network node to obtain the information may comprise instructions which, when executed by the processor, cause the network node to: transmit, using some or all of the individual beams of the set of transmitting beams, a plurality of signals; receive signals from one or more receiving devices; and derive the information from the received signals or from information derived from the received signals.

The signals received at the network node may be response signals received from the one or more receiving devices in response to the transmitted plurality of signals.

The instructions, when executed by the processor, may cause the network node to select the one or more of the candidate beams by: selecting a first subset of the set of candidate beams and selecting a second subset of the set of candidate beams, and may further cause the network node to use the selected first subset for individual narrow-beam SS transmission or RACH detection and to use the selected second subset for broad-beam SS transmission or RACH detection.

The first subset may comprise a predetermined number of the candidate beams which are associated in the information with a lowest signal strength or a highest path loss.

Alternatively, the instructions, when executed by the processor, may cause the network node to select the one or more of the candidate beams by: dividing a first beam group comprising the candidate beams having the lowest RACH success ratio into two RACH receive beams for use by the network node for RACH detection; and combining a second beam group and a third beam group comprising the candidate beams having the highest RACH success ratio to form a single RACH receive beam for use by the network node for RACH detection.

The set of beams may comprise a grid of beams.

A third aspect of the present disclosure provides a system comprising: a network node; and one or more wireless devices, wherein the network node is configured to: transmit a plurality of signals into a coverage area of the network node using a set of transmitting beams of the network node, each individual beam of the set having a unique beam direction; receive one or more signals from the one or more wireless devices using a set of receiving beams of the network node, each individual beam of the set having a unique beam direction, wherein the system is configured to: obtain information relating to the signals received or transmitted using the set of receiving beams or the set of transmitting beams of the network node; determine a set of candidate beams for use by the network node for synchronisation signal (SS) transmission or random access channel (RACH) detection; based on the obtained information, select one or more of the determined candidate beams, and wherein the network node is further configured to:
use the selected one or more of the determined candidate beams for synchronisation signal (SS) transmission or random access channel (RACH) detection by the network node.

The system may comprise: a data processing entity, wherein the data processing entity is configured to: receive, from the network node, information relating to the signals received or transmitted using the set of receiving beams or the set of transmitting beams of the network node; process the information received from the network node to derive the information; and transmit the derived information to the network node, and the network node may be configured to: determine the set of candidate beams for use by the network node for synchronisation signal (SS) transmission or random access channel (RACH) detection; and based on the obtained information, select one or more of the determined candidate beams.

Alternatively, the system may comprise: a data processing entity, wherein the data processing entity is configured to: receive, from the network node, information relating to the signals received or transmitted using the set of receiving beams or the set of transmitting beams of the network node; process the information received from the network node to derive the information; determine the set of candidate beams for use by the network node for synchronisation signal (SS) transmission or random access channel (RACH) detection; based on the obtained information, select one or more of the determined candidate beams; and transmit information defining the selected one or more of the determined candidate beams to the network node.

The signals received or transmitted using the set of receiving beams or a set of transmitting beams of the network node may comprise: synchronisation signal blocks; or random access channel (RACH) signals; or reference signals.

The information may relate to one or more of: path loss between a wireless device and the network node; signal strength of a signal of the plurality of signals transmitted by the network node; and a random access success ratio for a beam of the set of beams used by the network node to transmit the plurality of signals.

The information may be derived from multiple measurements performed over a period of time.

The information may comprise a function of direction of arrival, DoA, of each individual beam.

The DoA may be defined at least in part by an angle of elevation and an azimuth angle.

The network node may be configured to obtain the information by: transmitting, using some or all of the individual beams of the set of transmitting beams, a plurality of signals; and/or receiving signals from one or more receiving devices; and deriving the information from the received signals or from information derived from the received signals.

The received signals may be response signals received from the one or more receiving devices in response to the transmitted plurality of signals.

The system may be configured to select one or more of the candidate beams by selecting a first subset of the set of candidate beams and selecting a second subset of the set of candidate beams, and the network node may be configured to use the selected first subset for individual narrow-beam SS transmission or RACH detection and to use the selected second subset for broad-beam SS transmission or RACH detection.

The first subset may comprise a predetermined number of the candidate beams which are associated in the information with a lowest signal strength or a highest path loss.

Alternatively, the system may be configured to select one or more of the candidate beams by: dividing a first beam group comprising the candidate beams having the lowest RACH success ratio into two RACH receive beams for use by the network node for RACH detection; and combining a second beam group and a third beam group comprising the candidate beams having the highest RACH success ratio to form a single RACH receive beam for use by the network node for RACH detection.

The set of beams may comprise a grid of beams.

A fourth aspect of the disclosure provides a method, performed by a data processing entity that communicates with a network node, for selecting candidate beams for synchronisation signal (SS) transmission or random access channel (RACH) detection, the method comprising: obtaining, at the data processing entity, information relating to a plurality of signals received or transmitted using a set of receiving beams or a set of transmitting beams of the network node, each individual beam of the set having a unique beam direction; determining a set of candidate beams for use by the network node for synchronisation signal (SS) transmission or random access channel (RACH) detection; based on the obtained information, selecting one or more of the determined candidate beams; and notifying the network node of the selected one or more of the determined candidate beams.

Obtaining, at the data processing entity, the information may comprise: receiving, from the network node, signals from one or more receiving devices; and deriving the information from the received signals or from information derived from the received signals.

The received signals may be response signals received from the one or more receiving devices in response to plurality of signals transmitted by the network node.

The information may relate to one or more of: path loss between a receiving device and the network node; signal strength of a signal of the plurality of signals transmitted by the network node; and a random access success ratio for a beam of the set of beams used by the network node to transmit the plurality of signals.

The information may be derived from multiple measurements performed over a period of time.

A fifth aspect of the disclosure provides a data processing entity configured to communicate with a network node, the data processing entity comprising: a communications interface; a processor; and memory, wherein the memory stores instructions which, when executed by the processor, cause the data processing entity to: obtain information relating to a plurality of signals received or transmitted using a set of receiving beams or a set of transmitting beams of the network node, each individual beam of the set having a unique beam direction; determine a set of candidate beams for use by the network node for synchronisation signal (SS) transmission or random access channel (RACH) detection; based on the obtained information, select one or more of the determined candidate beams; and notify the network node of the selected one or more of the determined candidate beams.

The instructions, when executed by the processor, may cause the data processing entity to obtain the information by: receiving, from the network node, signals from one or more receiving devices; and deriving the information from the received signals or from information derived from the received signals.

The received signals may be response signals received from the one or more receiving devices in response to a plurality of signals transmitted by the network node.

The information may relate to one or more of: path loss between a receiving device and the network node; signal strength of a signal of the plurality of signals transmitted by the network node; and a random access success ratio for a beam of the set of beams used by the network node to transmit the plurality of signals.

The information may be derived from multiple measurements performed over a period of time.

A sixth aspect of the disclosure provides a computer program comprising instructions which, when executed on at least one processor, cause the at least one processor to carry out a method according to the first or fourth aspects.

A seventh aspect of the disclosure provides a carrier containing a computer program according to the sixth aspect, wherein the carrier comprises one of an electronic signal, optical signal, radio signal or computer readable storage medium.

An eighth aspect of the disclosure provides a computer program product comprising non transitory computer readable media having stored thereon a computer program according to the sixth aspect.

BRIEF DESCRIPTION OF THE DRAWINGS

Embodiments of the disclosure will now be described, strictly by way of example only, with reference to the accompanying drawings, of which:

FIGS. 17 to 20 are flowcharts illustrating methods implemented in a communication system including a host computer, a base station and a user equipment.

DETAILED DESCRIPTION

Wireless devices served by a particular network node such as a base station, eNodeB (eNB), Transmit/Receive Point (TRP) or the like are typically not distributed equally over the angular domain, due to a combination of geometry (e.g. more wireless devices may be covered by an angular interval spanning the horizon than by a similar angular interval at elevation angles below the horizon) and non-uniform spatial distribution of the wireless devices themselves or their traffic demands. Furthermore, the path loss experienced by these wireless devices is typically also not equal over the angular space. For example, for a wireless device that is located close to the network node the path loss in a direction from the antenna of the wireless device to an antenna of the network node may be much lower than the path loss in a direction from the antenna of a wireless device that is located towards the edge of the cell to the network node antenna.

The path loss for individual wireless devices as a function of direction of arrival (DoA) angle can be measured. This can be done based on RACH accesses or other uplink channel transmissions, for example. It can also be based on wireless device reported channel state information reference signal (CSI-RS) signal strength measurements corresponding to different beamshapes used for downlink CSI-RS transmissions. These individual measurements can be grouped according to the DoA angle and optionally additional criteria to generate information which can be used to group beams based on aspects of the generated information.

Figure 1:
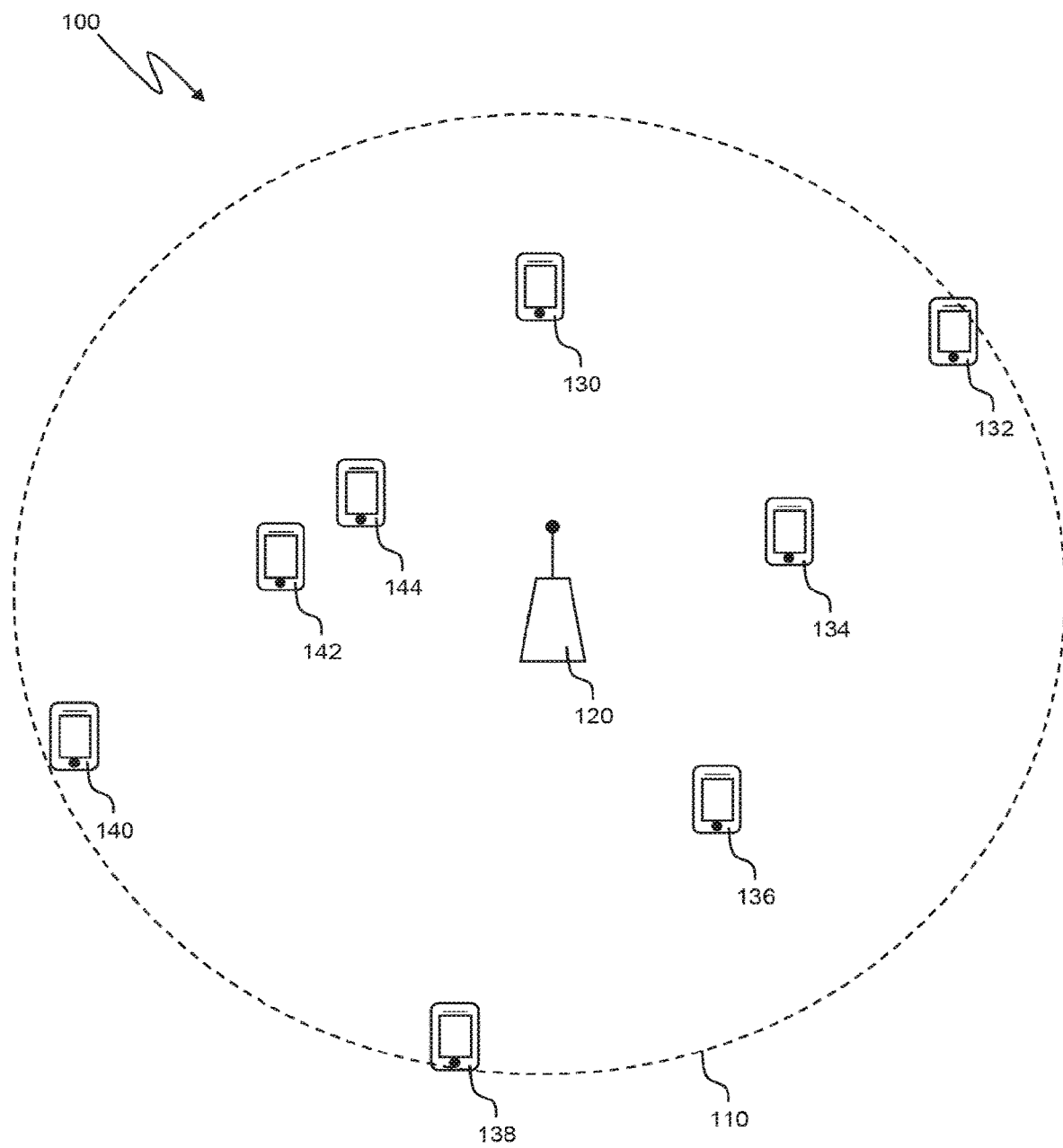
FIG. 1 is a schematic representation of a cell of a mobile telecommunications network, in which a plurality of wireless devices are served by a network node.
Figure 2:
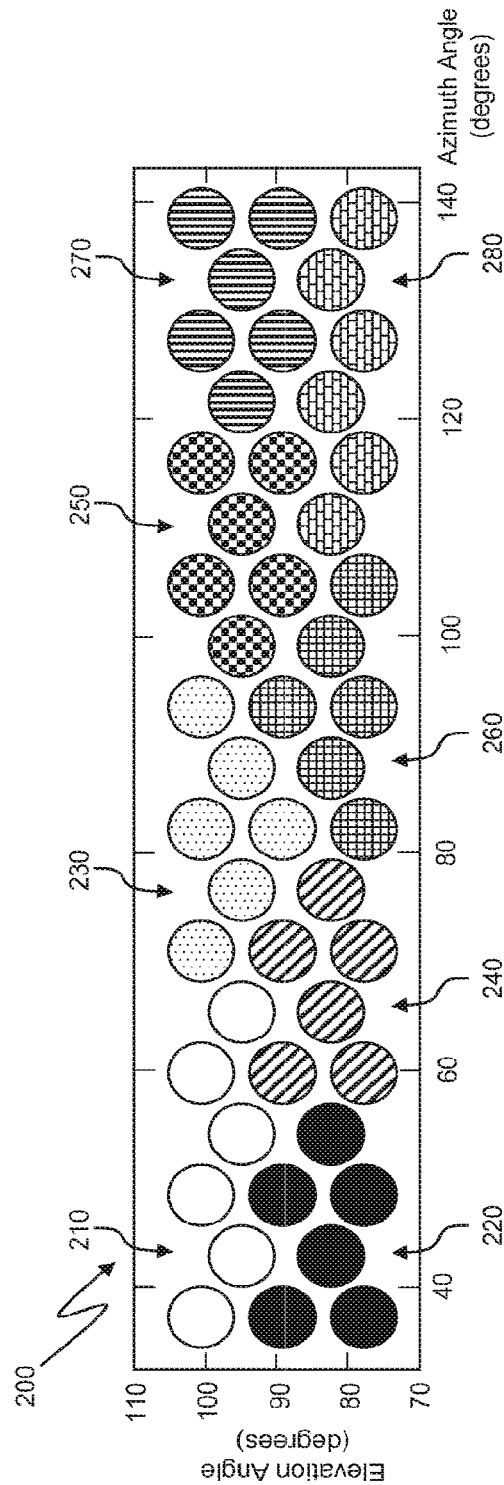
FIG. 2 is a schematic representation of a grid of beams in which individual beams have been grouped into beam groups.
Figure 3:
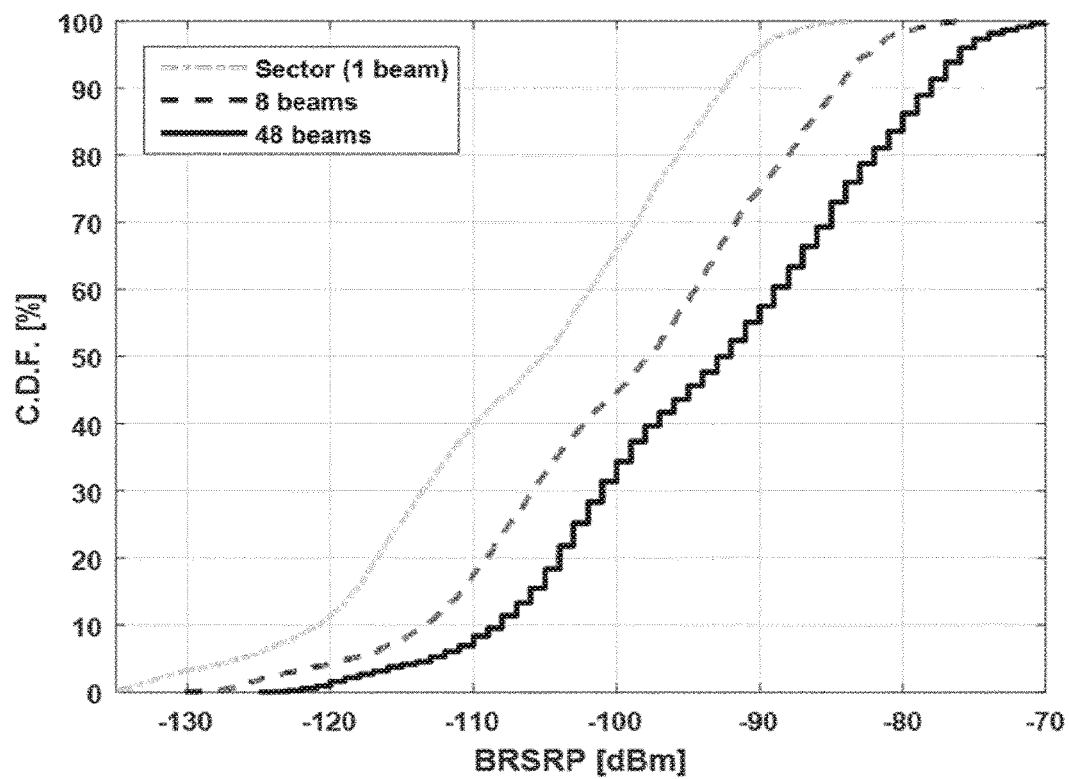
FIG. 3 shows an example of a distribution of measured signal strength for signals received by RACH beams formed by grouping individual beams.
Figure 4:
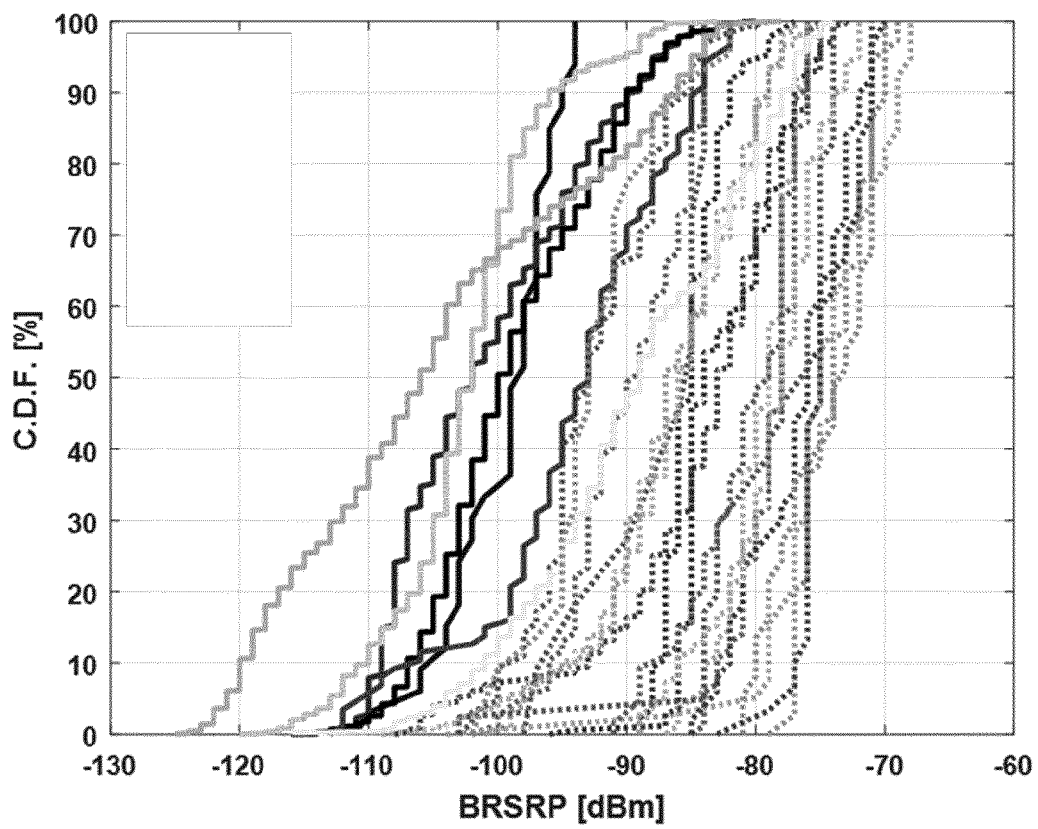
FIG. 4 shows an example of a distribution of measured signal strength for each beam group in the grid of beams of FIG. 2.

One example is shown in FIG. 4, which shows distributions of the measured signal strength (in terms of beam reference signal received power, BRSRP) in each beam in a beam grid comprising 48 beams as in FIG. 2 covering a grid spanning certain angular intervals in azimuth and elevation. Here each distribution is formed by gathering all available estimates for the corresponding beam, but other embodiments may include some weighting of samples depending on user identity, selection and/or filtering based on time.

As described above, known RACH beamforming techniques either sweep through a large number (e.g. 64) of individual beams, which causes delay in the RACH process, or else group individual beams into a smaller number (e.g. 8) of beam groups, each containing a plurality (e.g. 6) of individual beams to reduce the delay incurred in sweeping through the beams (since as smaller number of beam groups are swept) at the expense of reduced likelihood of RACH success, due to the reduced gain of the beam groups as compared to that of an individual beam.

Embodiments of the present disclosure aim to provide an improved RACH mechanism which reduces the delay incurred in sweeping beams whilst also improving the likelihood of RACH success as compared to known techniques.

Embodiments of the present disclosure provide a method, performed by a network node, for beamforming in which information relating to a plurality of signals that have been received or transmitted using a set of receiving beams or a set of transmitting beams of the network node. Each individual beam of the set has a unique beam direction. A set of candidate beams for use by the network node for transmitting synchronisation signals (SS) or detecting random access (RACH) channels is determined, and, based on the obtained information, one or more of the determined candidate beams are selected and used for SS transmission or RACH detection by the network node.

The information facilitates an informed selection of candidate beams for SS transmission and/or RACH reception, to increase the likelihood of a successful RACH process for wireless devices that are located in hard to reach areas of the cell (e.g. wireless devices located at the edge of the cell) without increasing the delay incurred by sweeping through beams. Thus, the candidate beams that are most likely to reach wireless devices in hard to reach areas of the cell, based on the obtained information, can be selected and used for SS transmission and/or RACH detection. The information may be derived from multiple measurements performed over a period of time and comprise statistical data.

Figure 5:
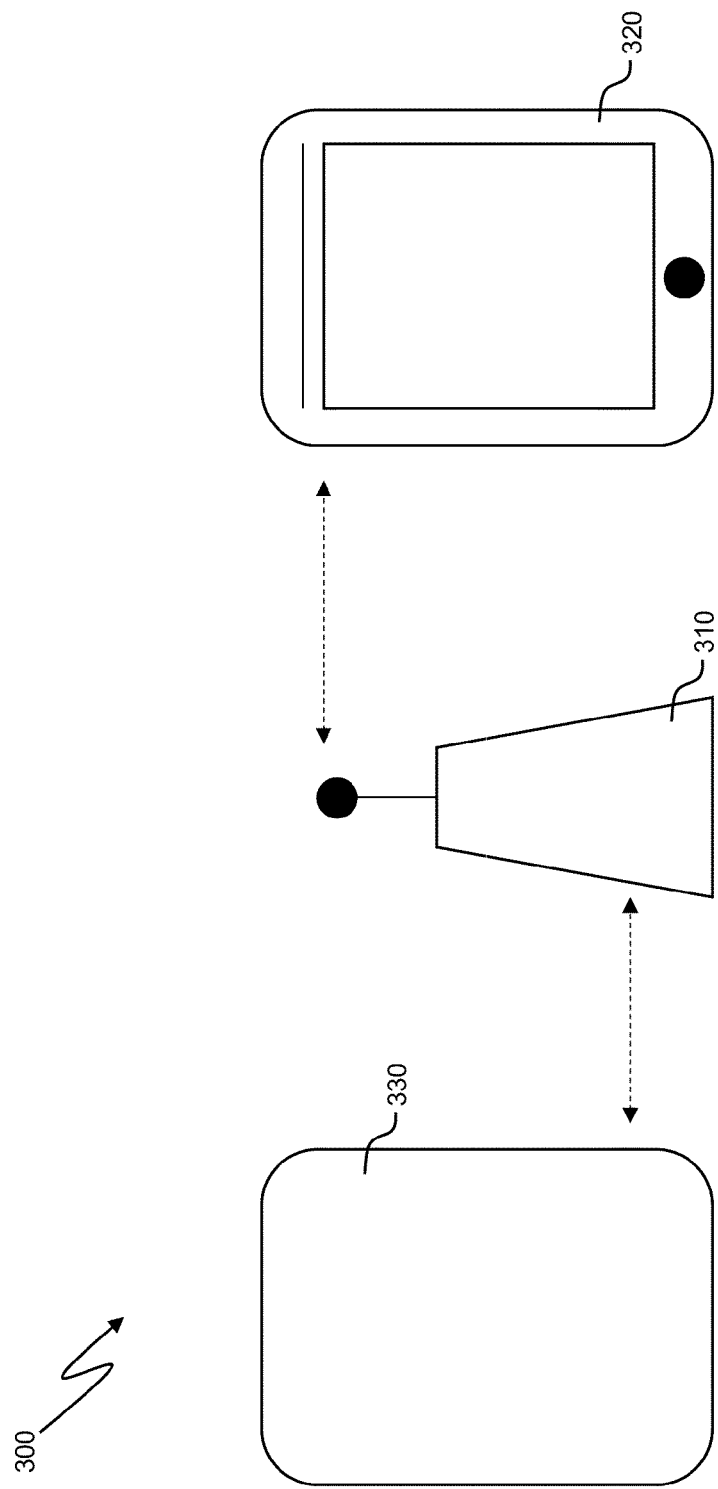
FIG. 5 is a schematic representation of a telecommunications system including a network node, a wireless device and a data processing entity.

FIG. 5 is a schematic representation of a telecommunications system 300. The telecommunications system 300 in this example includes a network node 310 such as a base station, eNB or TRP. The telecommunications system 300 also includes one or more wireless devices 320, which may be, for example, mobile telephones or the like, which communicate with the network node 310. The telecommunications system 300 further includes a data processing entity 330, which may be, for example, a computing device that is physically remote from the network node 310, which communicates with the network node 310.

Figure 6:
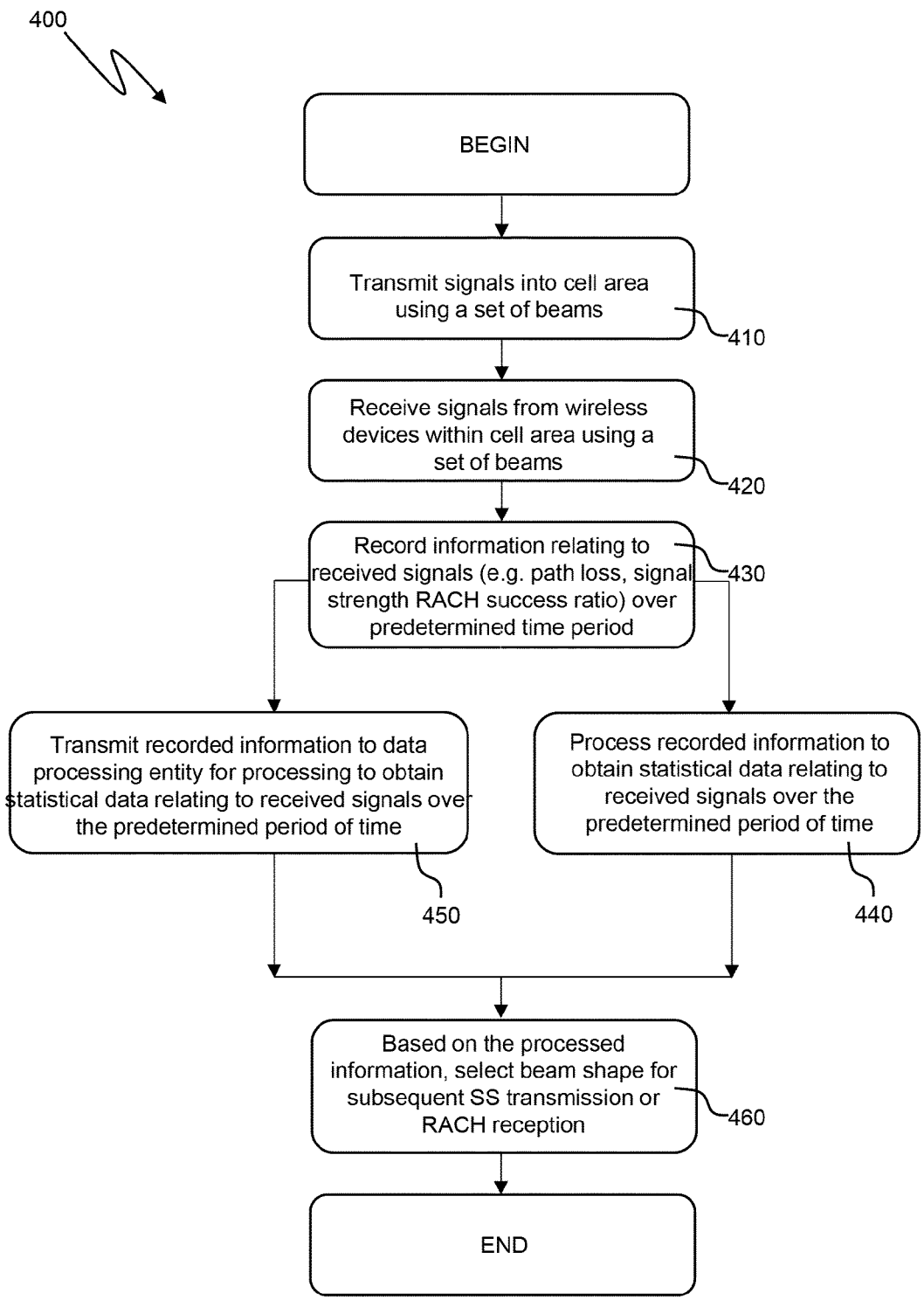
FIG. 6 is a flow chart illustrating steps in a beamforming method.

Referring now to FIG. 6, a method for beam selection is described. The method may be performed by a telecommunications system or by a network node such as a base station, eNB or TRP, and is illustrated generally at 400. In the method 400, a beam shape of a beam (which may be made up of a plurality of individual beams) for use by the network node for RACH detection or SS block transmission is selected based on information obtained based on signals received from wireless devices such as UEs with a coverage area of the network node (e.g. a cell served by a base station).

In a first step 410, the network node transmits a plurality of signals using a set of transmitting beams, each beam of the set having a unique beam shape and direction (e.g. each beam may have a different combination of azimuth angle and elevation angle, relative to an origin that is common to all of the beams, than the other beams of the set). The transmitted signals may be, for example, synchronisation signal (SS) blocks broadcast into a cell area covered by the network node, or may be, for example, reference signals or specific signals for the purpose of determining said information.

The network node may transmit the plurality of signals using a grid of beams of the kind illustrated in FIG. 2. The plurality of signals may be transmitted using all of the individual beams of the grid of beams, by sweeping through the plurality of individual beams. Alternatively, the individual beams of the grid of beams may be grouped into beam groups, as discussed above, and the network node may transmit the plurality of signals by sweeping through the beam groups (rather than the individual beams), in order to reduce the time delay incurred by the sweeping. Alternatively, the beams may be generated by other methods such as digital beamforming.

In a subsequent step 420, the network node receives signals from wireless devices such as UEs that are present within the coverage area of the network node in response to the plurality of transmitted signals. In some examples these signals may be in response to transmitted SS blocks, in which case the received signals may comprise initial access signals as part of a normal RACH process. In other examples the received signals may comprise other reporting signals such as measurement signals, for example providing channel state information. The signals are received by individual beams of a set of receiving beams, in some examples the same set of beams as was used to transmit the plurality of signals. In other examples, a different set of beams is used. Different sets of beams may correspond to, for example, different individual beams or different beam configurations. A direction of arrival (DoA) for each received signal can be determined, based, for example, on the unique combination of azimuth angle and elevation angle of each individual beam of the set of receiving beams.

At step 430 the network node records information relating to signals received from the wireless devices that are present in the coverage area of the network node. In some examples the network node may record information over a predetermined period of time.

The predetermined period of time may be, for example, 24 hours, one week, or some other period of time.

The information recorded by the network node may relate to path loss between the network node and a wireless device from which the signal was received, as a function of the direction of arrival of signals received at the network node.

Additionally or alternatively, the information recorded by the network node may relate to signal strength of a signal received by a wireless device from the network node. In some examples the information relates to measurements performed by a wireless device (e.g. where a signal received by the network node from a wireless device includes a channel state information (CSI) report). Such measurements are recorded as a function of the direction of arrival of signals received at the network node.

Additionally or alternatively, the information recorded may relate to a RACH success ratio as a function of the direction of arrival of signals received at the network node. Thus, for each received signal, the network node may record the direction of arrival of that signal, as determined, for example, by the azimuth angle and elevation angle of the individual beam of the set of receiving beams that received the signal, and the path loss between the network node and the wireless device for that signal and/or the reported signal strength for that signal, and/or an indication as to RACH success or failure for that signal.

The recorded information is then processed to obtain statistical data relating to the received signals over the predetermined period of time.

In some embodiments the processing may be performed by the network node itself (step 440).

In other embodiments the network node may transmit the recorded information to a data processing entity to obtain the statistical data (step 450).

In some examples the data processing entity is a separate node in a communications network, such as an application server. In other examples the data processing entity may be a remote computing device or system. In such examples the network node transmits the recorded information to the remote computing device or system, e.g. over the internet, for processing by the remote computing device or system.

The processing may generate a set of unique candidate beams, each candidate beam of the set having a different direction (e.g. having a different combination of azimuth angle and elevation angle relative to an origin that is common to all of the candidate beams). The set of candidate beams may correspond to the set of transmitting beams used to transmit the SS signals, in the sense that each candidate beam has a direction that corresponds to a direction of a beam of the set of transmitting beams. However, the set of candidate beams need not correspond in this way to the set of transmitting beams. For example, the candidate beams of the set of unique candidate beams may have directions selected based on the directions of arrival of the signals received by the network node from the wireless devices.

Based on the processed information, the network node selects, at step 460, a beam shape for one or more SS transmitting or RACH receiving beams to be used by the network node for subsequent SS block transmission or RACH detection, by selecting suitable ones of the candidate beams.

In a first approach, which will now be discussed with reference to FIG. 7, SS blocks are initially transmitted by the network node into the coverage area of the network node, as part of a normal RACH process, using a set of beams, each beam of the set having a unique beam shape (e.g. a different combination of azimuth angle and elevation angle, relative to an origin that is common to all of the beams, than the other beams of the set). The SS blocks may be transmitted by sweeping through a number of beam groups, each beam group containing a number of individual beams, for example using a beam group arrangement as shown in FIG. 2. Alternatively, the SS blocks may be transmitted by sweeping through a number of individual beams.

Over a predetermined period of time (e.g. 24 hours or one week), the network node records information relating to signals received from wireless devices that are present in the coverage area of the network node, such as the path loss between a wireless device and an individual beam, or the signal strength of a signal received by a wireless device via an individual beam, as reported by a wireless device to the network node. Based on the information recorded, the network node obtains statistical data relating to the received signals over the predetermined period of time, either by processing the information itself or by transmitting the information to a remote data processing entity for processing.

As discussed above, the processing may generate a set of unique candidate beams, each candidate beam of the set having a different direction (e.g. having a different combination of azimuth angle and elevation angle relative to an origin that is common to all of the candidate beams). The set of candidate beams may correspond to the set of transmit beams that was used to transmit the SS signals, in the sense that each candidate beam has a direction that corresponds to a direction of a beam of the set of transmit beams. However, the set of candidate beams need not correspond in this way to the set of transmit beams. For example, the candidate beams of the set of unique candidate beams may have directions selected based on the directions of arrival of the signals received by the network node from the wireless devices.

Each of the candidate beams is also associated with statistical data such an average path loss for a path in the direction of the candidate beam or average signal strength of signals transmitted in the direction of the candidate beam.

Following this processing, a number of individual beams of the set of candidate beams that are shown by their associated statistical data to be directed at difficult to reach areas of the coverage area served by the network node, e.g. because those beams are associated with the lowest average signal strength or the highest average path loss over the predetermined period, are selected for use as individual SS transmitting or RACH receiving beams for subsequent SS block transmission or RACH detection. In this way, a small number of narrow, high gain beams can be selected for SS block transmission or RACH detection, with each of these beams being directed towards a particular region of the coverage area of the network node. Two or more of the remaining candidate beams are grouped into a beam group such that a broader and therefore less directional and lower gain beam is formed to cover the remaining coverage area of the network node.

Figure 7:
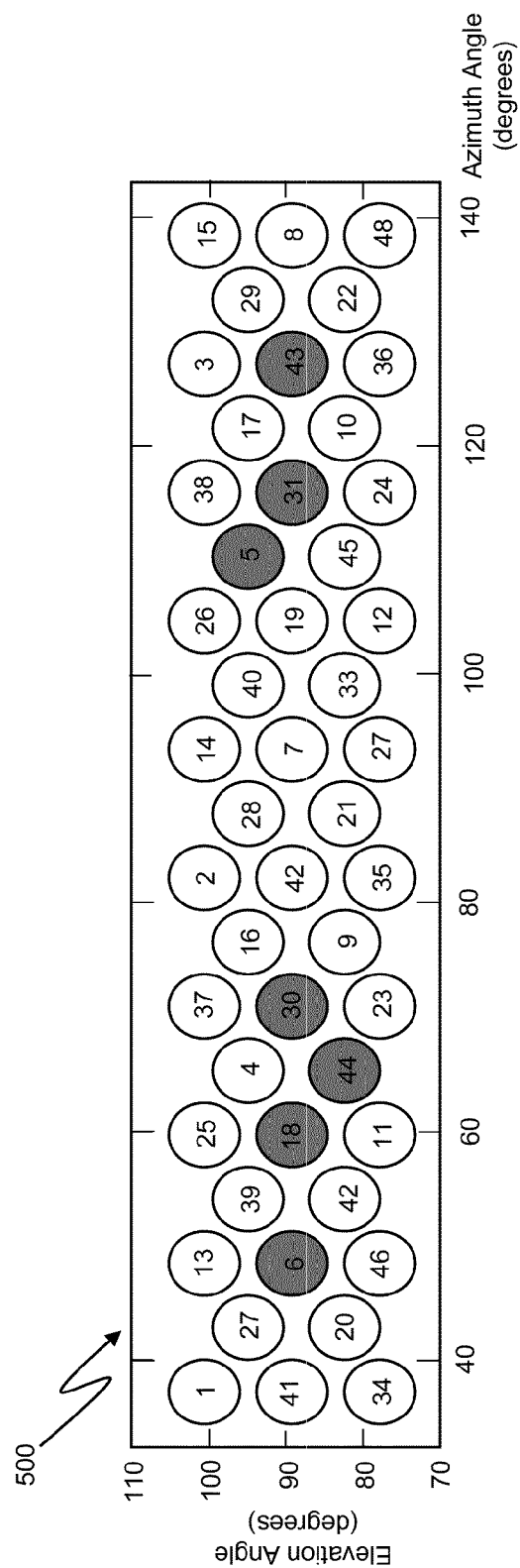
FIG. 7 is a schematic representation of a grid of beams in which individual beams have been selected.

In the example illustrated in FIG. 7, the seven candidate beams associated with the lowest average signal strength or the highest average path loss over the predetermined period, labelled as candidate beams 5, 6, 18, 30, 31, 43 and 44 in FIG. 7, are selected for use as individual narrow SS transmitting or RACH receiving beams for subsequent SS block transmission or RACH detection, directed towards particular regions of the coverage area of the network node, whilst the remaining 41 candidate beams are grouped into a single broader beam group to cover the remaining coverage area of the network node.

Thus, the shape of a beam (defined by the individual beams of the set of candidate beams) to be used by the network node in future SS block transmission and/or RACH detection is selected based on the processed information, so as to increase the overall success rate of the RACH process without increasing the delay incurred in performing the RACH process, as compared to the process discussed above relation to FIG. 2 in which eight beam groups are used. This is because the total number of beam groups to be swept through is unchanged (though some of the beam "groups" actually comprise single individual beams), but the highly directional narrow individual beams selected provide increased beam gain for those regions of the coverage area identified, based on the processed information, as being hard to reach, and thus give rise to an increased likelihood of SS detection and subsequent successful completion of the RACH process by a wireless device that is located in such a region.

Figure 8:
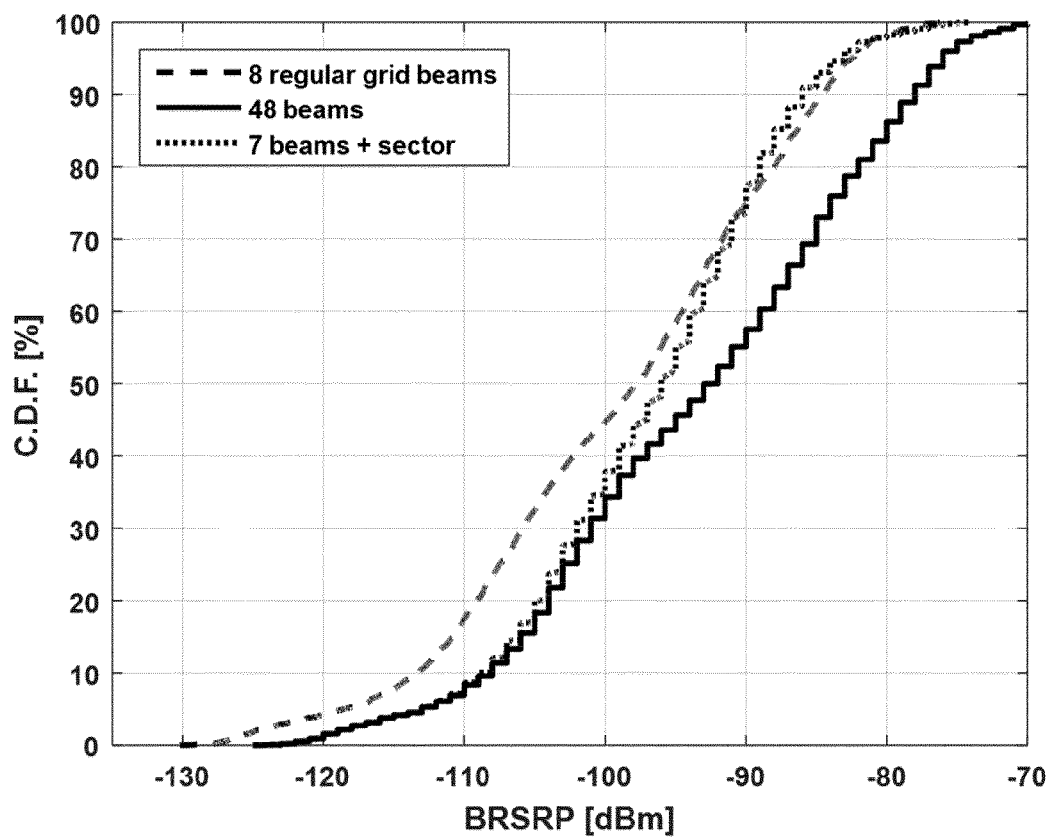
FIG. 8 shows an example of distributions of measured signal strength for the selected individual beams of the grid of beams of FIG. 7.

FIG. 8 shows an example of distributions of the measured signal strength (in terms of beam reference signal received power, BRSRP) for the seven candidate beams (labelled as candidate beams 5, 6, 18, 30, 31, 43 and 44 in FIG. 7) selected for use as individual narrow beam SS transmitting or RACH receiving beams for subsequent SS block transmission or RACH detection and the remaining 41 candidate beams that are grouped into a single broader beam group for subsequent broad beam SS block transmission or RACH detection, together with the measured signal strength distribution when all 48 individual beams are used for SS block transmission or RACH beam reception. As can be seen from FIG. 8, in this example the signal strength at the $10^{th}$ percentile for the combination of the seven selected narrow beams and the single broad beam group is equal to that when all 48 individual beams are used. Thus, the use of the seven narrow-beam SS transmitting or RACH receiving beams and the single broad-beam SS transmitting or RACH receiving beam group can offer a similar RACH success rate as using all 48 individual beams as SS transmitting or RACH receiving beams, without the delay associated with sweeping through all 48 individual beams.

Figure 9:
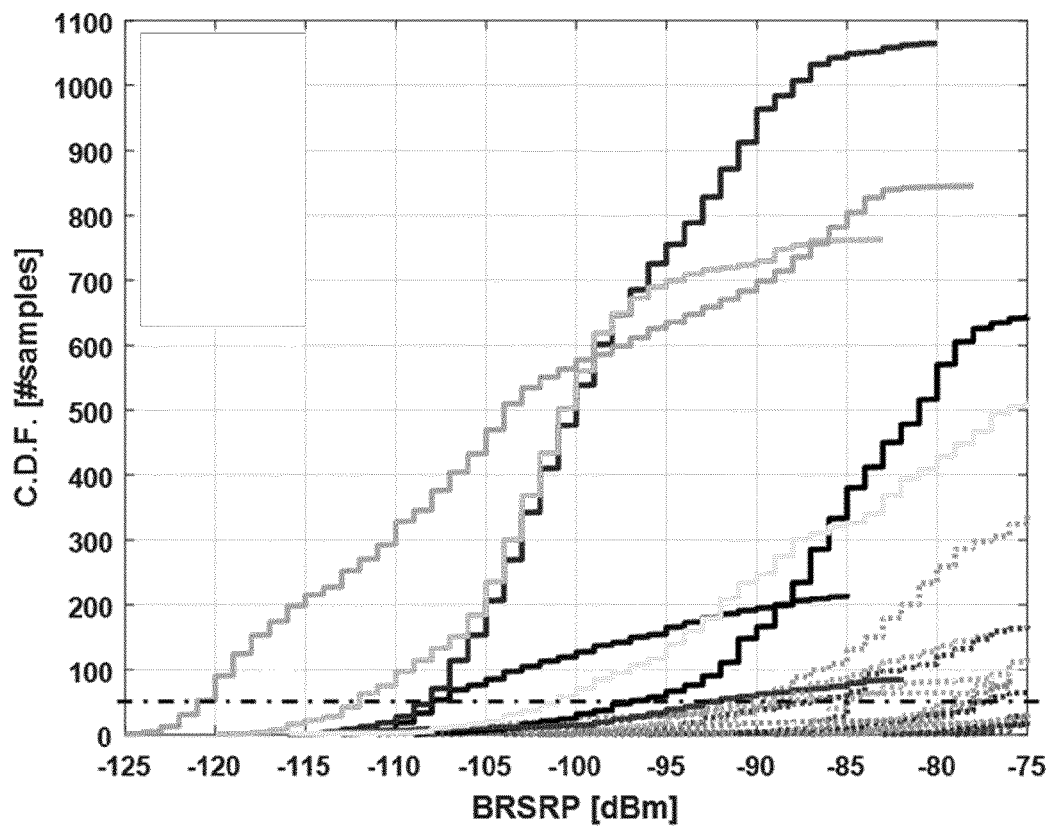
FIG. 9 shows an example of a distribution of signal strength per beam against a cumulative number of samples of signals received by beams.

The signal strength as a function of DoA also has statistical properties that are dependent upon the traffic distribution within the cell. This can be taken into account by comparing the number of samples of signals received from particular directions to a threshold, such that, for example, instead of simply selecting the beams associated with the lowest signal strength or the greatest path loss, the beams with the lowest average signal strength or greatest average path loss over 50 samples can be selected. This is illustrated in FIG. 9, which shows the statistical distribution of signal strength per beam (in terms of beam reference signal received power, BRSRP) against a cumulative number of samples.

In a second approach, which will now be discussed with reference to FIG. 10, SS blocks are initially transmitted by the network node into the coverage area of the network node using a set of transmitting beams grouped into a number of different transmitting beam groups, as part of a normal RACH process as described above.

Over a predetermined period of time (e.g. 24 hours or one week), the network node records information relating to RACH success for each beam, by noting the number of times the RACH process is successfully completed for each beam and the number of times the RACH process is not successfully completed for each beam. This information is processed, either by the network node itself or by a remote computing device, to obtain statistical data relating to the ratio of RACH success for each beam.

As discussed above, the processing may generate a set of unique candidate beams, each candidate beam of the set having a different direction (e.g. having a different combination of azimuth angle and elevation angle relative to an origin that is common to all of the candidate beams). The set of candidate beams may correspond to the set of transmit beams that was used to transmit the SS signals, in the sense that each candidate beam has a direction that corresponds to a direction of a beam of the set of transmit beams. However, the set of candidate beams need not correspond in this way to the set of transmit beams. For example, the candidate beams of the set of unique candidate beams may have directions selected based on the directions of arrival of the signals received by the network node from the wireless devices.

Each of the candidate beams is also associated with statistical data such as RACH success ratio for RACH signals transmitted in the direction of the candidate beam.

Based on the obtained processed information, the network node divides the worst performing beam group, i.e. the beam group associated with the lowest ratio of RACH success into two beam groups, and combines the two beam groups associated with the highest ratio of RACH success.

Figure 10:
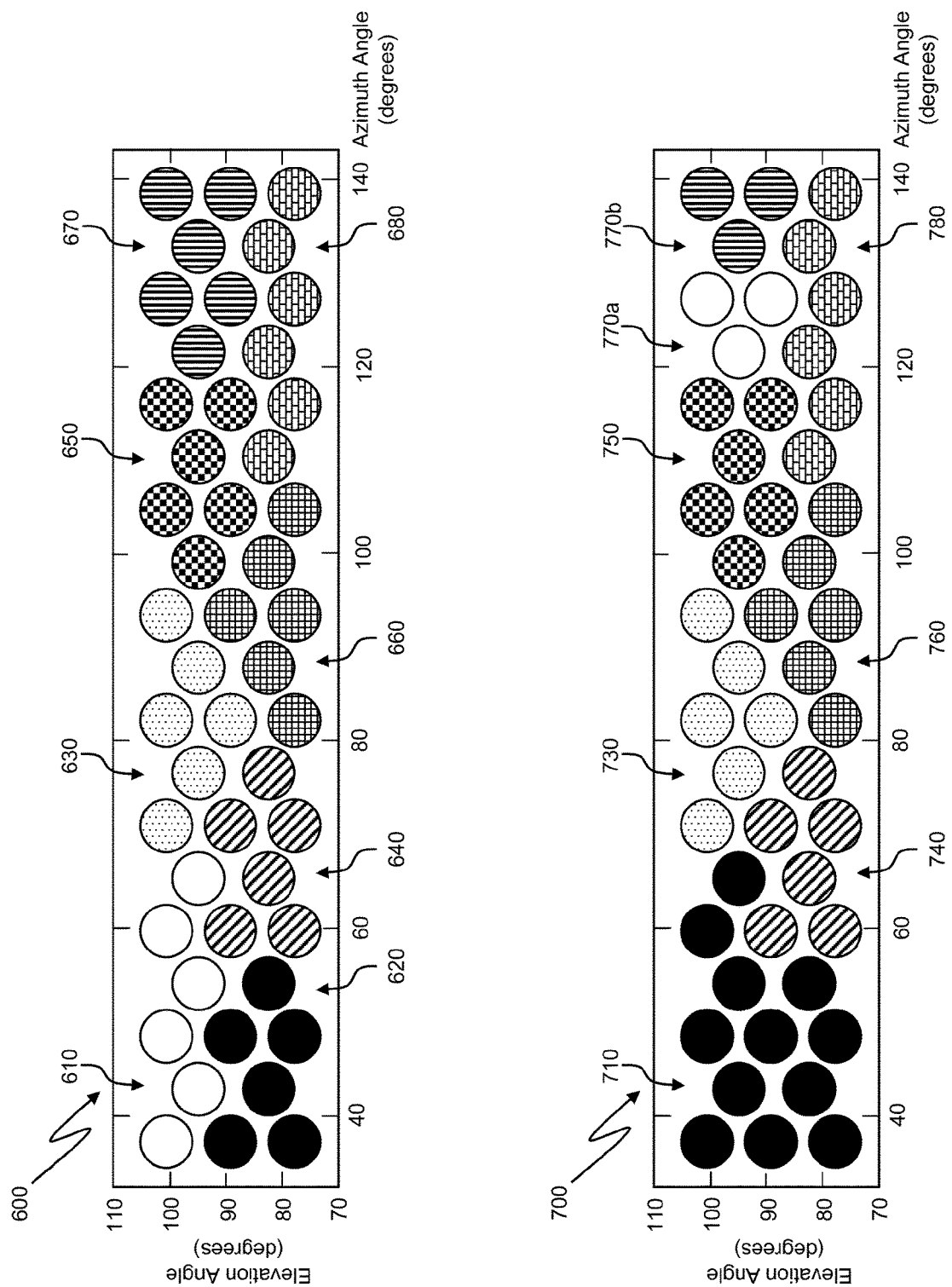
FIG. 10 is a schematic representation of a grid of beams in which individual beams have been grouped into beam groups.

This approach is illustrated schematically in FIG. 10, in which the uppermost GoB 600 shows eight beam groups 610, 620, 630, 640, 650, 660, 670, 680, each comprising six individual beams, that are used by the network node for initial SS block transmission.

The lowermost GoB 600 in FIG. 10 shows the beam groups selected, based on the statistical data relating to RACH success ratios, for subsequent SS transmission and/or RACH detection.

As can be seen in FIG. 10, the beam groups 610, 620 used by the network node for initial SS block transmission, which each comprise six individual beams, have been combined into a single beam group 710 comprising twelve individual beams. Additionally, the beam group 670 used by the network node for initial SS block transmission has been divided into two different beam groups 770a, 770b, each of which comprises only three individual beams. The other beam groups 630, 640, 650, 660, 680 used by the network node for initial SS block transmission are unchanged. Thus, for future SS block transmission and/or RACH detection, the network node will use the beam group 710 comprising twelve individual beams, the beam groups 630, 640, 650, 660 and 680 each comprising six individual beams, and the beam groups 770a and 770b which each comprise three individual beams.

In this way, those regions of the coverage area of the network node that are statistically less likely to result in successful completion of the RACH process can be targeted by narrow, higher gain, beams (the beam groups 770a, 770b), whilst those areas that are statistically more likely to result in successful completion of the RACH process can be covered by a broader, lower gain, beam (the beam group 710).

Thus, the shape of a beam (defined by the individual beams of the set) to be used by the network node in future SS block transmission and/or RACH detection is selected based on the processed information, so as to increase the overall success rate of the RACH process without increasing the delay incurred in performing the RACH process, as compared to the process discussed above relation to FIG. 2 in which eight beam groups are used. This is because the total number of beam groups to be swept through is unchanged, but the narrower, higher gain beam groups provide increased beam gain for those regions of the coverage area identified, based on the statistical data, as being hard to reach, and thus give rise to an increased likelihood of successful completion of the RACH process by a wireless device that is located in such a region.

Figure 11:
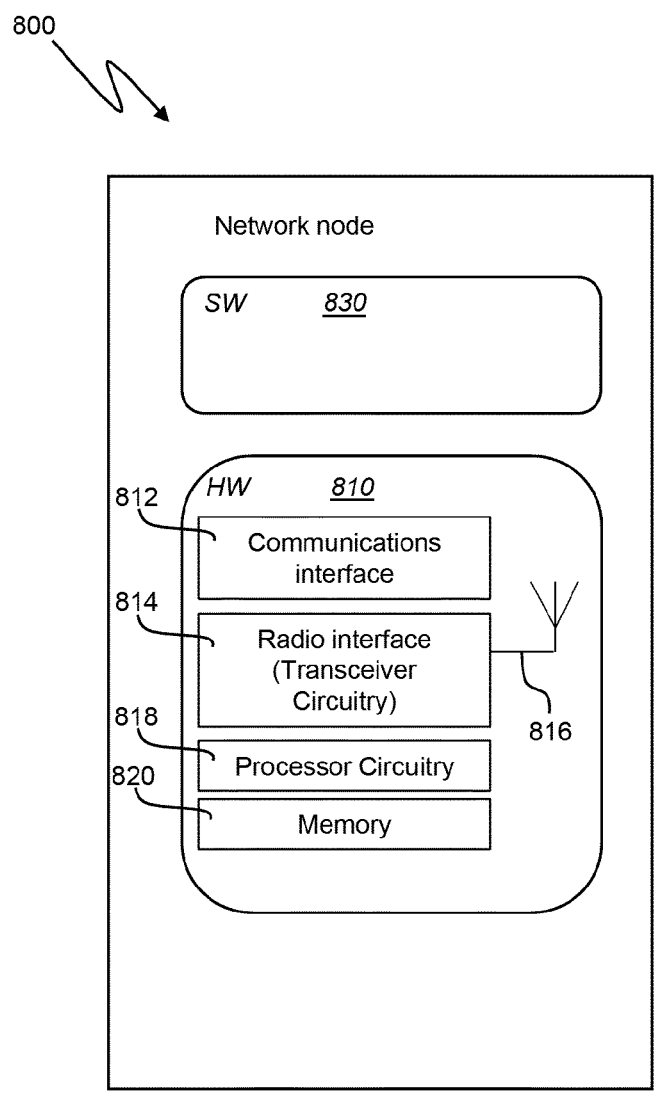
FIG. 11 is a schematic representation of a network node.

Referring now to FIG. 11, a network node is shown generally at 800. The network node may be, for example, a base station, an eNodeB, a TRP or the like. The network node 800 comprises hardware 810 which may include a communications interface 812 configured to establish and maintain a wired or wireless connection with a core network.

The hardware 810 of the network node 800 further includes a radio interface which comprises transceiver circuitry 814 configured to establish and maintain a wireless connection with one or more wireless devices such as a UEs. The transceiver circuitry 814 is coupled to one or more beamforming antennas 816 (which may be arranged so as to implement a grid of beams), which are operative to transmit and receive signals via a plurality of beams as discussed above.

The hardware 810 of the network node 800 further includes processor circuitry 818 which may comprise, for example, one or more programmable processors, application specific integrated circuits (ASICs), field programmable gate arrays (FPGAs) or combinations of such processors configured or adapted to execute instructions. The hardware 810 of the network node 800 further includes a computer program product 820 in the form of memory coupled to or integrated with the processor circuitry 818 and operative to store executable instructions and data. The network node 800 further includes software/computer program 830 which may be stored, for example, in the computer program product 820 in the form of memory.

The software/computer program 830 is configured to record, in the computer program product 820, in the form of memory, the information relating to signals received from the wireless devices that are present in the coverage area of the network node 800. Thus, the software/computer program 830 may record information relating to the path loss between the network node 800 and a wireless device that is present in the coverage area of the network node 800, and/or information relating to the signal strength of a signal received by a wireless device that is present in the coverage area of the network node 800, and/or information relating to the ratio of RACH success for each beam.

In one embodiment, the software/computer program 830 obtains the processed information from the recorded information by processing the recorded information itself to obtain statistical data. In this embodiment the software/ computer program 830 is further configured to select, based on the obtained information, a beam shape, defined by one or more candidate beams, for a beam for use by the network node 800 in subsequent SS block transmission and/or RACH detection In an alternative embodiment, the software/computer program 830 is operative to cause the recorded information to be transmitted to a remote data processing entity, via the communications interface 812, for processing to obtain the information, and to receive the statistical data from the remote data processing entity (also via the communications interface 812). In this embodiment the software/computer program 830 is further configured to select, based on the obtained information, a beam shape, defined by one or more candidate beams, for a beam for use by the network node 800 in subsequent SS block transmission and/or RACH detection.

In a further alternative embodiment, the software/computer program 830 is operative to cause the recorded information to be transmitted to a remote data processing entity, via the communications interface 812, for processing to obtain the statistical data, and to receive, from the remote data processing entity (also via the communications interface 812), beam shape information defining a beam shape for a beam for use by the network node 800 in subsequent SS block transmission and/or RACH detection. In this embodiment the remote data processing entity processes the recorded information to derive the statistical data and, based on the processed information, selects the beam shape for use by the network node 800 in subsequent SS block transmission and/or RACH detection and transmits information defining the selected beam shape to the software/computer program 830.

Figure 12:
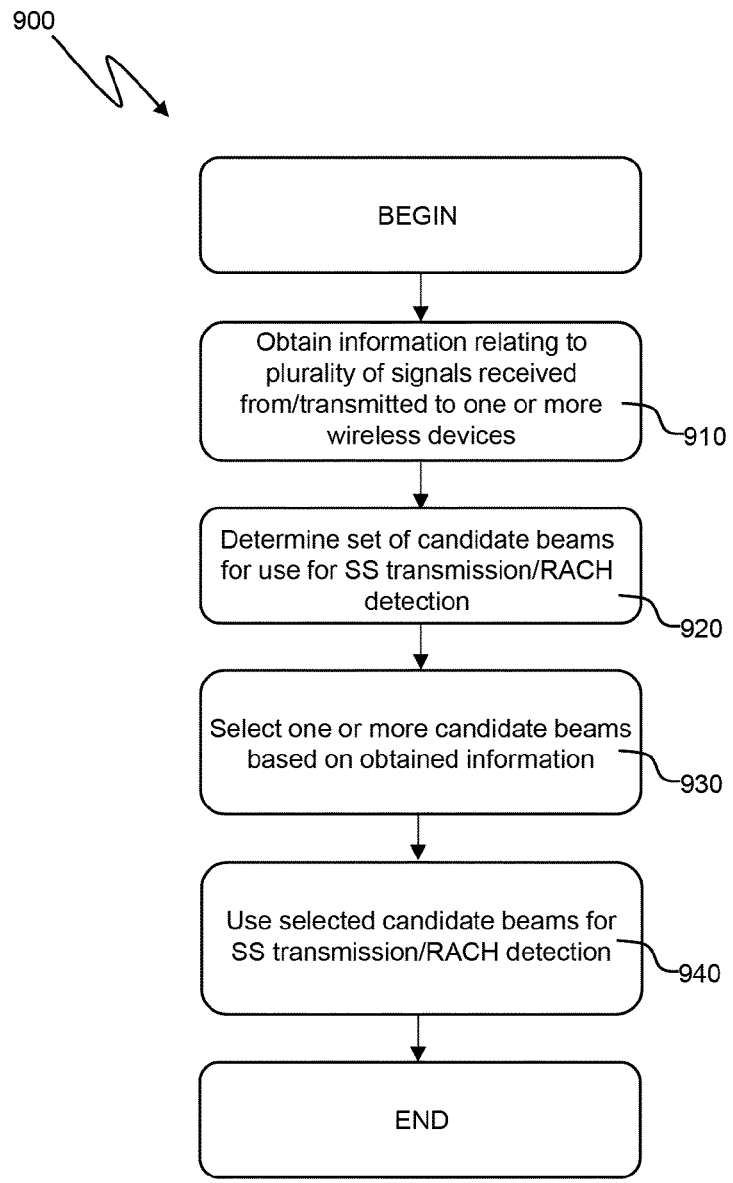
FIG. 12 is a flow chart illustrating steps in a method performed by the network node of FIG. 11.

FIG. 12 is a flow chart illustrating steps in a method, performed by the network node 800, for beamforming.

The method, shown generally at 900, commences at step 910, in which the network node 800 obtains information relating to a plurality of signals received from or transmitted to one or more wireless devices using a set of receiving beams or a set of transmitting beams of the network node. Each beam in the set of receiving beams or the set of transmitting beams has a unique beam direction. For example, each beam in the set may have a different azimuth angle and/or a different angle of elevation, with respect to an origin that is common to all of the beams of the set, than the other beams of the set.

As discussed above, the information may relate, for example, to a path loss between a receiving wireless device and the network node 800, or to a signal strength of a signal of the plurality of signals transmitted by the network node, or to a random access success ratio for a signal of the plurality of signals transmitted by the network node.

In some embodiments the network node 800 obtains the information by processing information relating to signals received from wireless terminal devices that are present in the coverage area of the network node 700 that has been recorded by the network node 800, as discussed above.

In other embodiments the network node obtains the information from a remote data processing entity, also as discussed above.

At step 920, the network node 800 determines a set of candidate beams for use by the network node for synchronisation signal (SS) transmission or random access (RACH) detection.

At step 930, the network node 800 selects, based on the obtained information, one or more of the determined candidate beams. Then, at step 940, the network node uses the selected one or more of the determined candidate beams for synchronisation signal transmission or RACH reception.

Figure 13:
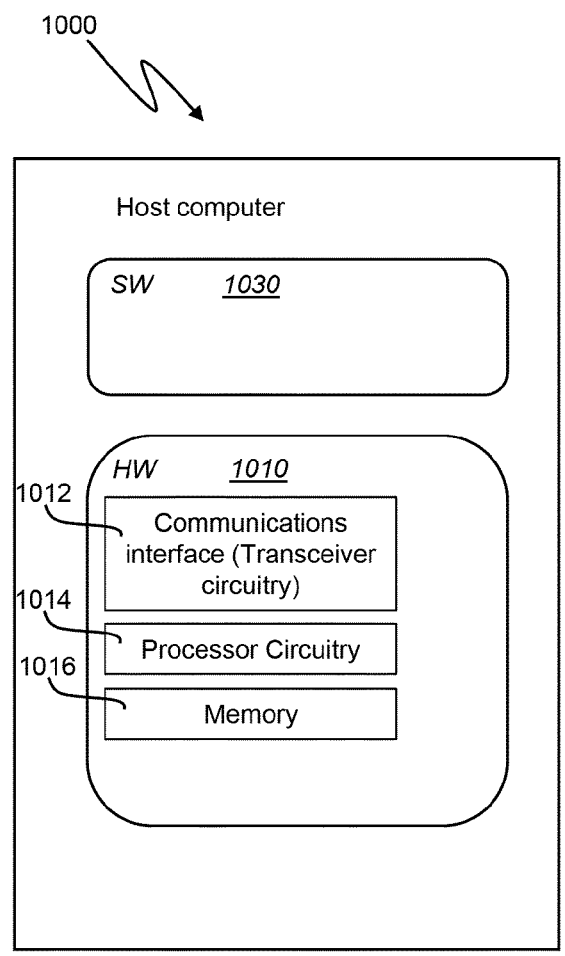
FIG. 13 is a schematic illustration of a data processing entity.

Referring now to FIG. 13, a host computer is shown generally at 1000. The host computer 1000 is a remote computing device which operates as a data processing entity with which the network node 800 may communicate to obtain information relating to a plurality of signals received from or transmitted to one or more wireless devices, using a set of receiving beams or a set of transmitting beams of the network node, each individual beam of the set having a unique beam direction.

The host computer 1000 comprises hardware 1010 which includes a communications interface including transceiver circuitry 1012 configured to establish and maintain a wired or wireless connection with the network node 800.

The hardware 1010 of the host computer 1000 further includes processor circuitry 1014 which may comprise, for example, one or more programmable processors, application specific integrated circuits (ASICs), field programmable gate arrays (FPGAs) or combinations of such processors configured or adapted to execute instructions. The hardware 1010 of the host computer 1000 further includes memory 1016 coupled to or integrated with the processor circuitry 1014 and operative to store executable instructions and data. The host computer 1000 further includes software 1030 which may be stored, for example, in memory 1016.

Figure 14:
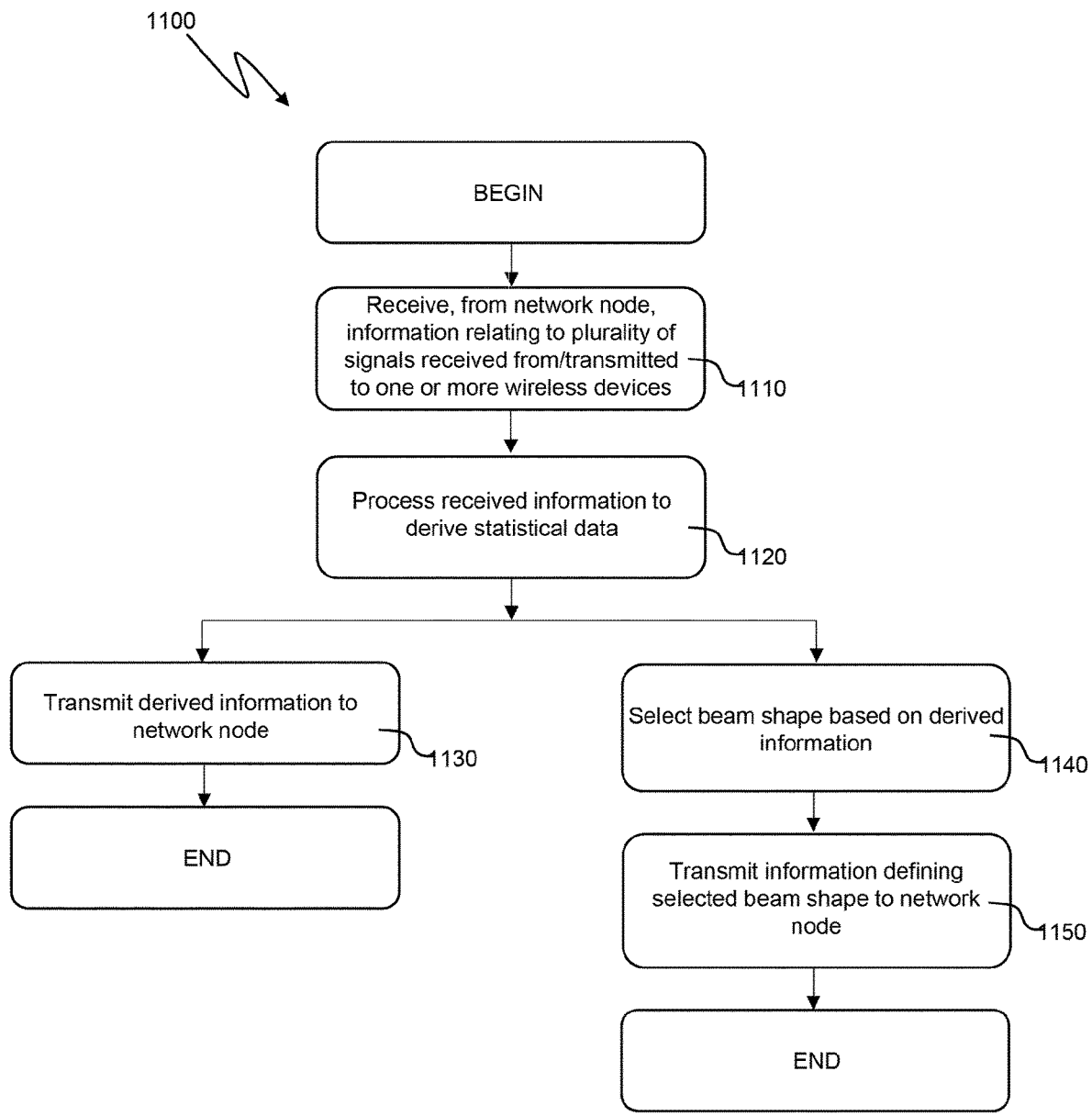
FIG. 14 is a flow chart illustrating steps in a method performed by the data processing entity of FIG. 13.

FIG. 14 is a flow chart illustrating steps in a method 1100 performed by the host computer 1000.

In a first step 1110, the host computer 1000 receives from the network node, via the transceiver circuitry 1012, the information relating to signals received from the wireless devices that are present in the coverage area of the network node 800 over the predetermined period of time. This information may be recorded, by the software 1030, in the memory 1016. Thus, the software 1030 of the host computer 1000 may record information relating to the path loss between the network node 1000 and a wireless device that is present in the coverage area of the network node 1000, and/or information relating to the signal strength of a signal received by a wireless device that is present in the coverage area of the network node 1000, and/or information relating to the ratio of RACH success for each beam.

At step 1120, the software 1030 processes the received information to derive the statistical data. In one embodiment, the software 1030 causes the host computer 1000 to transmit the derived statistical data to the network node using the transceiver circuitry 1012, at step 1130.

In an alternative embodiment, at step 1140 the software 1030 selects a beam shape, defined by one or more beams, for a beam for use by the network node 800 in subsequent SS block transmission and/or RACH detection, based on the derived information. Information defining the selected beam shape is then transmitted by the host computer 1000, via the communications interface 1012, to the network node at step 1150, to enable the network node to perform SS transmission and/or RACH detection using the selected beam shape.

Figure 15:
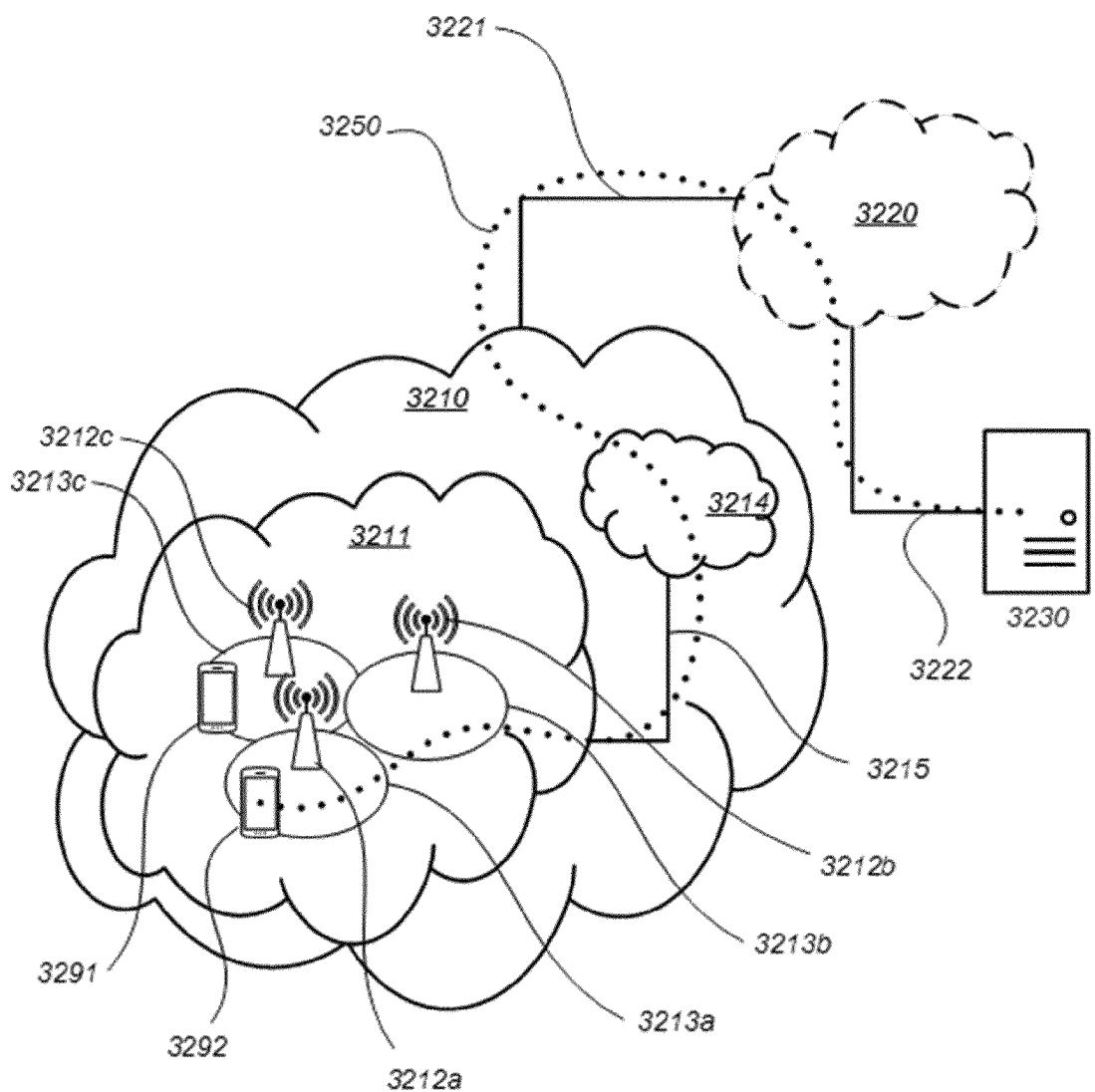
FIG. 15 schematically illustrates a telecommunication network connected via an intermediate network to a host computer.

With reference to FIG. 15, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 15 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 16. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 33) served by the base station 3320. The communication interface 3326 may be configured to facilitate a connection 3360 to the host computer 3310. The connection 3360 may be direct or it may pass through a core network (not shown in FIG. 33) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 16:
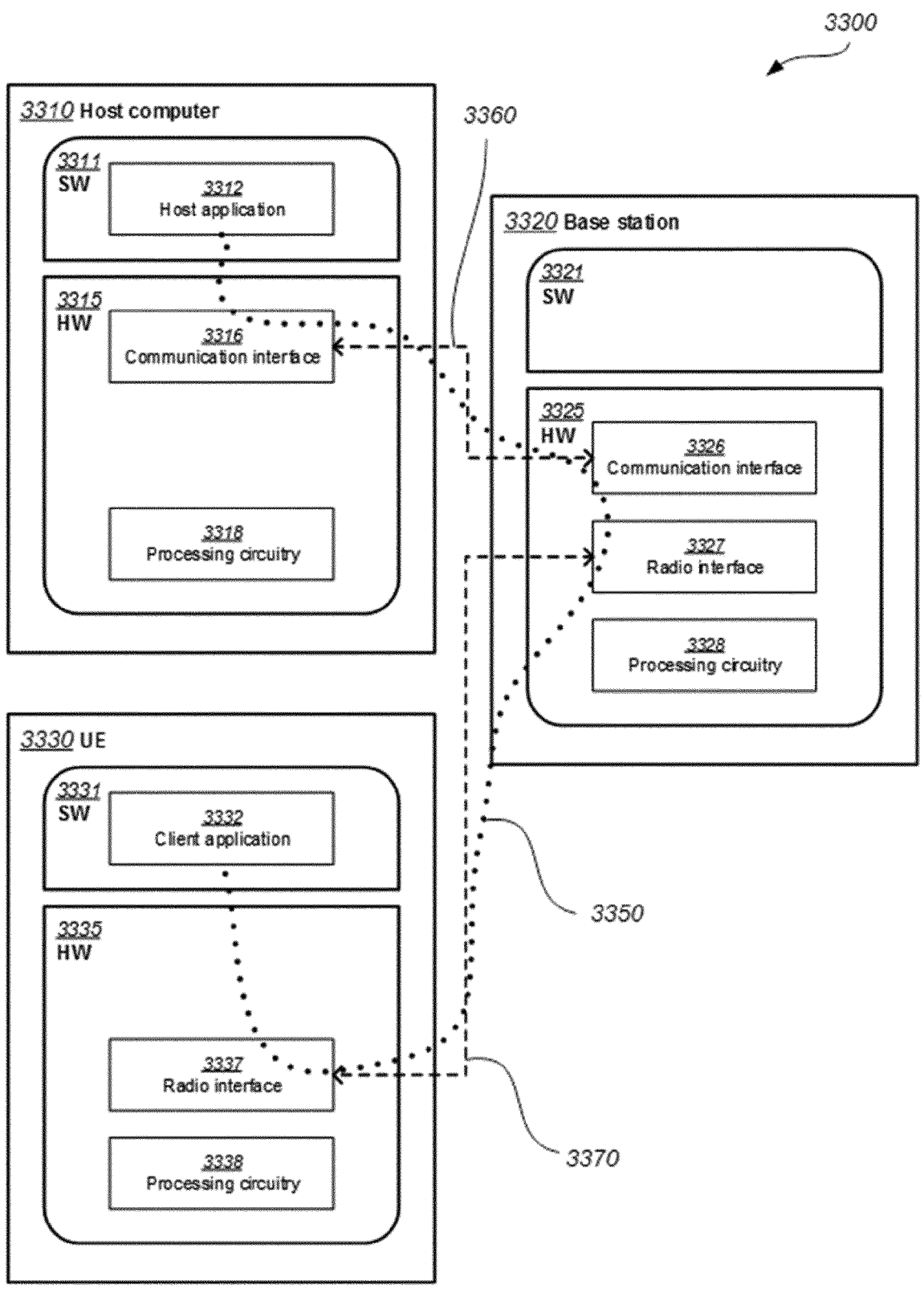
FIG. 16 is a generalized block diagram of a host computer communicating via a base station with a user equipment over a partially wireless connection.

It is noted that the host computer 3310, base station 3320 and UE 3330 illustrated in FIG. 16 may be identical to the host computer 3230, one of the base stations 3212a, 3212b, 3212c and one of the UEs 3291, 3292 of FIG. 15, respectively. This is to say, the inner workings of these entities may be as shown in FIG. 33 and independently, the surrounding network topology may be that of FIG. 32.

In FIG. 16, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency, and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

As described above, aspects of the present disclosure may be used in the provision of over the top (OTT) services. The numbered embodiments presented below provide details of such aspects.

1. A base station configured to communicate with a user equipment (UE), the base station comprising a radio interface and processing circuitry configured to: obtain information relating to a plurality of signals received from or transmitted to one or more UEs, using a set of receiving beams or a set of transmitting beams of the base station, each individual beam of the set having a unique beam direction; determine a set of candidate beams for use by the network node for synchronisation signal (SS) transmission or random access channel (RACH) detection; based on the obtained information, select one or more of the determined candidate beams; and use the selected one or more of the determined candidate beams for synchronisation signal (SS) transmission or random access channel (RACH) detection by a network node.

2. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to obtain information relating to a plurality of signals received from or transmitted to one or more UEs, using a set of receiving beams or a set of transmitting beams of the base station, each individual beam of the set having a unique beam direction; determine a set of candidate beams for use by the network node for synchronisation signal (SS) transmission or random access channel (RACH) detection; based on the obtained information, select one or more of the determined candidate beams; and using the selected one or more of the determined candidate beams for synchronisation signal (SS) transmission or random access channel (RACH) detection by a network node.

3. The communication system of embodiment 2, further including the base station.

4. The communication system of embodiment 3, further including the UE, wherein the UE is configured to communicate with the base station.

5. The communication system of embodiment 4, wherein: the processing circuitry of the host computer is configured to execute a host application, thereby providing the user data; and the UE comprises processing circuitry configured to execute a client application associated with the host application.

6. A method implemented in a base station, comprising obtaining, at the base station, information relating to a plurality of signals received from or transmitted to one or more UEs, using a set of receiving beams or a set of transmitting beams of the base station, each individual beam of the set having a unique beam direction; determining a set of candidate beams for use by the base station for synchronisation signal (SS) transmission or random access channel (RACH) detection; based on the obtained information, selecting one or more of the determined candidate beams; and using the selected one or more of the determined candidate beams for synchronisation signal (SS) transmission or random access channel (RACH) detection by the base station.

7. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station is configured to: obtain information relating to a plurality of signals received from or transmitted to one or more UEs, using a set of receiving beams ora set of transmitting beams of the base station, each individual beam of the set having a unique beam direction; determine a set of candidate beams for use by the network node for synchronisation signal (SS) transmission or random access channel (RACH) detection; based on the obtained information, select one or more of the determined candidate beams; and use the selected one or more of the determined candidate beams for synchronisation signal (SS) transmission or random access channel (RACH) detection by a network node.

8. The method of embodiment 8, further comprising: at the base station, transmitting the user data.

9. The method of embodiment 8, wherein the user data is provided at the host computer by executing a host application, the method further comprising: at the UE, executing a client application associated with the host application.

As will be apparent from the discussion above, the methods disclosed herein may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

As will be appreciated from the foregoing discussion, the methods, apparatus and systems described herein provide an increased likelihood of successful completion of the RACH process for wireless devices in hard to reach regions of a coverage area of a network node without substantially increasing the time taken to complete the RACH process, by providing high beamforming gain to those hard to reach regions without increasing the number of individual beams or beam groups to be swept through during SS transmission or RACH detection by the network node.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A method performed by a network node for beamforming, the method comprising:
  obtaining, at the network node, information relating to a plurality of signals received or transmitted using a set of receiving beams or a set of transmitting beams of the network node, wherein the information relates to one or more of:
    path loss between a receiving device and the network node;
    signal strength of a signal of the plurality of signals transmitted by the network node; and
    a random access success ratio for a beam of the set of beams used by the network node to transmit the plurality of signals and the information is derived from multiple measurements performed over a period of time; and
    each individual beam of the set having a unique beam direction;
  determining a set of candidate beams for use by the network node for synchronization signal, SS, transmission or random access channel, RACH detection;
    based on the obtained information, selecting one or more of the determined candidate beams, wherein selecting one or more of the candidate beams comprises selecting a first subset of the set of candidate beams and selecting a second subset of the set of candidate beams, and wherein using the selected one or more of the determined candidate beams for SS transmission or RACH detection by the network node comprises using the selected first subset for individual narrow-beam SS transmission or RACH detection and using the selected second subset for broad-beam SS transmission or RACH detection; and using the selected one or more of the determined candidate beams for SS transmission or RACH detection by the network node.

2. The method according to claim 1 wherein the plurality of signals received or transmitted using a set of receiving beams or a set of transmitting beams of the network node comprise:
synchronization signal blocks; or
RACH signals; or
reference signals.

3. The method according to claim 1 wherein the information comprises a function of direction of arrival, DoA, of each individual beam.

4. The method according to claim 3, wherein the DoA is defined at least in part by an angle of elevation and an azimuth angle.

5. The method according to claim 1, wherein obtaining the information comprises:
transmitting by the network node, using some or all of the individual beams of the set of transmitting beams, a plurality of signals; and/or,
receiving, at the network node, signals from one or more receiving devices; and,
deriving the information from the received signals or from information derived from the received signals.

6. The method according to claim 1 wherein the signals received at the network node are response signals received from the one or more receiving devices in response to the transmitted plurality of signals.

7. The method according to claim 1 wherein the first subset comprises a predetermined number of the candidate beams which are associated in the information with a lowest signal strength or a highest path loss.

8. The method according to claim 1 wherein the set of beams comprises a grid of beams.

9. A network node comprising:
a radio interface comprising a beamforming antenna;
a processor; and
memory,
wherein the memory stores instructions which, when executed by the processor, cause the network node to:
obtain information relating to a plurality of signals received or transmitted using a set of receiving beams or a set of transmitting beams of the network node, wherein the information relates to one or more of:
path loss between a receiving device and the network node;
signal strength of a signal of the plurality of signals transmitted by the network node; and
a random access success ratio for a beam of the set of beams used by the network node to transmit the plurality of signals; and the information is derived from multiple measurements performed over a period of time and each individual beam of the set of transmitting beams having a unique beam direction;
determine a set of candidate beams for use by the network node for synchronisation signal, SS, transmission or random access channel, RACH, detection;
based on the obtained information, select one or more of the determined candidate beams, wherein selecting the one or more of the candidate beams comprises:
selecting a first subset of the set of candidate beams and selecting a second subset of the set of candidate beams, and further cause the network node to use the selected first subset for individual narrow-beam SS transmission or RACH detection and to use the selected second subset for broad-beam SS transmission or RACH detection; and use the one or more determined candidate beams for SS transmission or RACH detection by the network node.

10. The network node according to claim 9 wherein the plurality of signals received or transmitted using a set of receiving beams or a set of transmitting beams of the network node comprise:
synchronization signal blocks; or
RACH signals; or
reference signals.

11. The network node according to claim 9 wherein the information comprises a function of direction of arrival, DoA, of each individual beam.

12. The network node according to claim 11, wherein the DoA is defined at least in part by an angle of elevation and an azimuth angle.

13. The network node according to claim 9 wherein the instructions which, when executed by the processor, cause the network node to obtain the information comprise instructions which, when executed by the processor, cause the network node to:
transmit, using some or all of the individual beams of the set of transmitting beams, a plurality of signals; and/or,
receive signals from one or more receiving devices; and
derive the information from the received signals or from information derived from the received signals.

14. The network node according to claim 13 wherein the signals received at the network node are response signals received from the one or more receiving devices in response to the transmitted plurality of signals.

15. The network node according to claim 9, wherein the first subset comprises a predetermined number of the candidate beams which are associated in the information with a lowest signal strength or a highest path loss.

16. The network node according to claim 9 wherein the set of beams comprises a grid of beams.

17. A system comprising:
a network node; and
one or more wireless devices,
wherein the network node is configured to:
transmit a plurality of signals into a coverage area of the network node using a set of transmitting beams of the network node, each individual beam of the set having a unique beam direction;
receive one or more signals from the one or more wireless devices using a set of receiving beams of the network node, each individual beam of the set having a unique beam direction,
wherein the system is configured to:
obtain information relating to the signals received or transmitted using the set of receiving beams or the set of transmitting beams of the network node wherein the information relates to one or more of:
path loss between a receiving device and the network node;
signal strength of a signal of the plurality of signals transmitted by the network node; and
a random access success ratio for a beam of the set of beams used by the network node to transmit the plurality of signals; and
the information is derived from multiple measurements performed over a period of time and;

determine a set of candidate beams for use by the network node for synchronization signal, SS, transmission or random access channel, RACH, detection;

based on the obtained information, select one or more of the determined candidate beams, and wherein the network node is further configured to:

use the selected one or more of the determined candidate beams for SS transmission or RACH detection by the network node, wherein selecting the one or more of the candidate beams comprises:

selecting a first subset of the set of candidate beams and selecting a second subset of the set of candidate beams, and further cause the network node to use the selected first subset for individual narrow-beam SS transmission or RACH detection and to use the selected second subset for broad-beam SS transmission or RACH detection.

18. The system according to claim 17, wherein the system further comprises:

a data processing entity, wherein the data processing entity is configured to:

receive, from the network node, information relating to the signals received or transmitted using the set of receiving beams or the set of transmitting beams of the network node;

process the information received from the network node to derive the information; and transmit the derived information to the network node, and wherein the network node is configured to:

determine the set of candidate beams for use by the network node for SS transmission or RACH detection; and based on the obtained information, select one or more of the determined candidate beams.

19. The system according to claim 17, wherein the system further comprises:

a data processing entity, wherein the data processing entity is configured to:

receive, from the network node, information relating to the signals received or transmitted using the set of receiving beams or the set of transmitting beams of the network node;

process the information received from the network node to derive the information;

determine the set of candidate beams for use by the network node for SS transmission or (RACH detection;

based on the obtained information, select one or more of the determined candidate beams; and transmit information defining the selected one or more of the determined candidate beams to the network node.

20. The system according to claim 18, wherein the signals received or transmitted using the set of receiving beams or a set of transmitting beams of the network node comprise:

synchronization signal blocks; or (RACH signals; or reference signals.

* * * * *